US012605818B2

(12) United States Patent
Teramoto et al.

(10) Patent No.: US 12,605,818 B2
(45) Date of Patent: Apr. 21, 2026

(54) ELECTRIC POWER TOOL

(71) Applicant: MAKITA CORPORATION, Anjo (JP)

(72) Inventors: Makito Teramoto, Anjo (JP); Kiyonobu Yoshikane, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/944,803

(22) Filed: Nov. 12, 2024

(65) Prior Publication Data

US 2025/0187162 A1 Jun. 12, 2025

(30) Foreign Application Priority Data

Dec. 8, 2023 (JP) ................................ 2023-207539

(51) Int. Cl.
*B25C 1/06* (2006.01)

(52) U.S. Cl.
CPC ...................................... *B25C 1/06* (2013.01)

(58) Field of Classification Search
CPC ...................................................... B25C 1/06
See application file for complete search history.

(56) References Cited

U.S. PATENT DOCUMENTS

| | | | | |
|---|---|---|---|---|
| 11,198,211 | B2 | 12/2021 | Umino et al. | |
| 11,491,629 | B2 * | 11/2022 | Saitou | B25C 1/047 |
| 11,679,479 | B2 * | 6/2023 | Tam | B25C 1/047 227/130 |
| 12,158,195 | B2 * | 12/2024 | Kameda | F16H 1/321 |
| 2009/0188766 | A1 * | 7/2009 | Shima | B25C 1/047 173/217 |
| 2016/0229043 | A1 * | 8/2016 | Wyler | B25C 1/047 |
| 2017/0190037 | A1 * | 7/2017 | Sato | B25C 1/06 |
| 2018/0154505 | A1 * | 6/2018 | Sato | B25C 1/06 |
| 2019/0375084 | A1 * | 12/2019 | Bierdeman | B25C 1/047 |
| 2020/0114500 | A1 * | 4/2020 | Bierdeman | B25C 1/047 |
| 2020/0164498 | A1 * | 5/2020 | Wechselberger | B25C 1/047 |
| 2021/0308852 | A1 * | 10/2021 | Ueda | B25C 1/06 |
| 2022/0097219 | A1 * | 3/2022 | Kuriki | B25C 1/06 |
| 2022/0143798 | A1 * | 5/2022 | Cholst | B25C 1/041 |
| 2022/0371169 | A1 * | 11/2022 | Kuriki | B25C 1/008 |

FOREIGN PATENT DOCUMENTS

| | | |
|---|---|---|
| JP | 6627990 B2 | 1/2020 |

* cited by examiner

*Primary Examiner* — Lucas E. A. Palmer
(74) *Attorney, Agent, or Firm* — Oliff PLC

(57) ABSTRACT

An electric power tool includes an electric motor and a rotation direction restriction mechanism. The rotation direction restriction mechanism includes an outer ring, an inner circumferential member, cam surfaces, lock members, and a protrusion (eccentric mechanism). The inner circumferential member is located on an inner circumferential side of the outer ring. The cam surfaces are recessed on an outer circumferential surface of the inner circumferential member. The inner circumferential member rotates relatively to the outer ring in a first direction and is restricted from rotating in a second direction when the lock member moves within the corresponding cam surface.

19 Claims, 13 Drawing Sheets

ELECTRIC POWER TOOL

CROSS-REFERENCE TO RELATED APPLICATION

This application claims priority to Japanese patent application serial number 2023-207539, filed on Dec. 8, 2023, the contents of which are incorporated herein by reference in their entirety for all purposes.

TECHNICAL FIELD

The present invention generally relates to an electric power tool that is driven by an electric motor.

BACKGROUND

For example, a so-called gas-spring type driving tool is well known. The driving tool includes a driver that drives a driving member, a lift mechanism that moves the driver to a standby position or a top dead center, and an electric motor serving as a driving force of the lift mechanism. The driving tool also includes a cylinder that extends in a driving direction and a piston that is connected to the driver and movable within the cylinder. When the driver and the piston moves in a direction opposite to the driving direction (anti-driving direction) owing to the lift mechanism, a pressure of the gas filled in an accumulation chamber above the cylinder increases. The driver moves in the driving direction owing to the gas pressure as a thrust force to drive a driving member.

The lift mechanism moves the driver and the piston in the anti-driving direction by rotation of the lift mechanism in, for example, a first direction. Because of this, the lift mechanism receives a force to rotate the lift mechanism in a second direction opposite to the first direction owing to the pressure of the gas filled in the accumulation chamber. If the lift mechanism is configured to be rotatable in the second direction, the driver and the piston cannot be held against the gas pressure. Because of this, for example, a one-way clutch is arranged so as to restrict rotation of the lift mechanism in one direction in an area between the electric motor and the lift mechanism.

The one-way clutch includes, for example, an approximately disc-shaped inner circumferential member that transmits a rotational power and an approximately tubular-shaped outer ring that surrounds an outer circumference of the inner circumferential member. A cam surface is formed in either an outer circumferential surface of the inner circumferential member or an outer circumferential surface of the outer ring. A lock member such as, for example, a cylindrical-shaped pin is inserted into the cam surface. It is configured such that one end side of the cam surface in a circumferential direction is formed to have a wide width in a radial direction and the other end side thereof to have a narrower width. When the inner circumferential member rotates in the first direction, the lock member moves to a side on which the cam surface has a wide width. Accordingly, the inner circumferential member is rotatable in the first direction without restriction. On the contrary, when the inner circumferential member rotates in the second direction opposite to the first direction, the lock member moves to a side on which the cam surface has a narrow width. Because of this configuration, the lock member is held between the inner circumferential member and the outer ring. As a result, the inner circumferential member is restricted from rotating in the second direction.

In the conventional one-way clutches, each component is arranged symmetrically arranged relating to a rotation center of the inner circumferential member. In this case, there is a case where rotation in the second direction cannot be restricted in a satisfactory manner. The following is such a case. Grease is applied to a member such as, for example, a gear train around the one-way clutch mechanism. It may happen that, for example, owing to heat caused by driving the electric motor, grease enters the cam surface of the one-way clutch mechanism and be cooled and solidified, or viscosity of the grease increases. In this case, the grease may prevent the lock member from moving to a side on which the cam surface has the narrow width. In this manner, when the lock member is restricted from moving, the inner circumferential member cannot be restricted from rotating in the second direction.

Furthermore, some of the one-way clutches in the prior art may include a spring etc. which constantly biases the lock member to a side on which the cam surface has a narrow width. However, an additional space is needed to include a configuration in which the lock member is constantly biased. When the one-way clutch mechanism is to be arranged in an area where a lot of members are arranged, such as, for example, in the planetary gear mechanism, it may be difficult to secure a sufficient space without interfering with the members. For example, when a number of gears increase, a sufficient space cannot be secured to arrange the spring etc. Furthermore, a cost for attaching the spring etc. may increase.

Thus, there is a need for an electric power tool with a rotation direction restriction mechanism to restrict a rotation direction of the one-way clutch.

SUMMARY OF THE DISCLOSURES

According to one aspect of the present disclosure, an electric power tool comprises an electric motor and a rotation direction restriction mechanism for restricting a direction of an output rotation of the electric motor. The rotation direction restriction mechanism includes an outer ring, an inner circumferential member arranged on an inner circumferential side of the outer ring, and a plurality of cam surfaces which are recessed on an inner circumferential surface of the outer ring or an outer circumferential surface of the inner circumferential member. The rotation direction restriction mechanism further includes lock members each of which is movable within a corresponding cam surface such that the plurality of lock members allows the inner circumferential member to rotate relatively to the outer ring in a first direction and restrict in a second direction. The rotation direction restriction mechanism further includes an eccentric mechanism for making the outer ring and the inner circumferential member mutually eccentric.

Because of this configuration, when the outer ring and the inner circumferential member are made eccentric by the eccentric mechanism, a part of the plurality of cam surfaces is located at a position where the outer ring closely fits to the inner circumferential member in the radial direction. At least one of the lock members inserted into the cam surfaces can closely fit both of the outer ring and the inner circumferential member. Accordingly, when the inner circumferential member starts to rotate relatively to the outer ring, the lock member is firmly bitten between the outer ring and the inner circumferential member. Thus, relative rotation of the inner circumferential member relating to the outer ring can be restricted in one direction.

DETAILED DESCRIPTION

Figure 1:
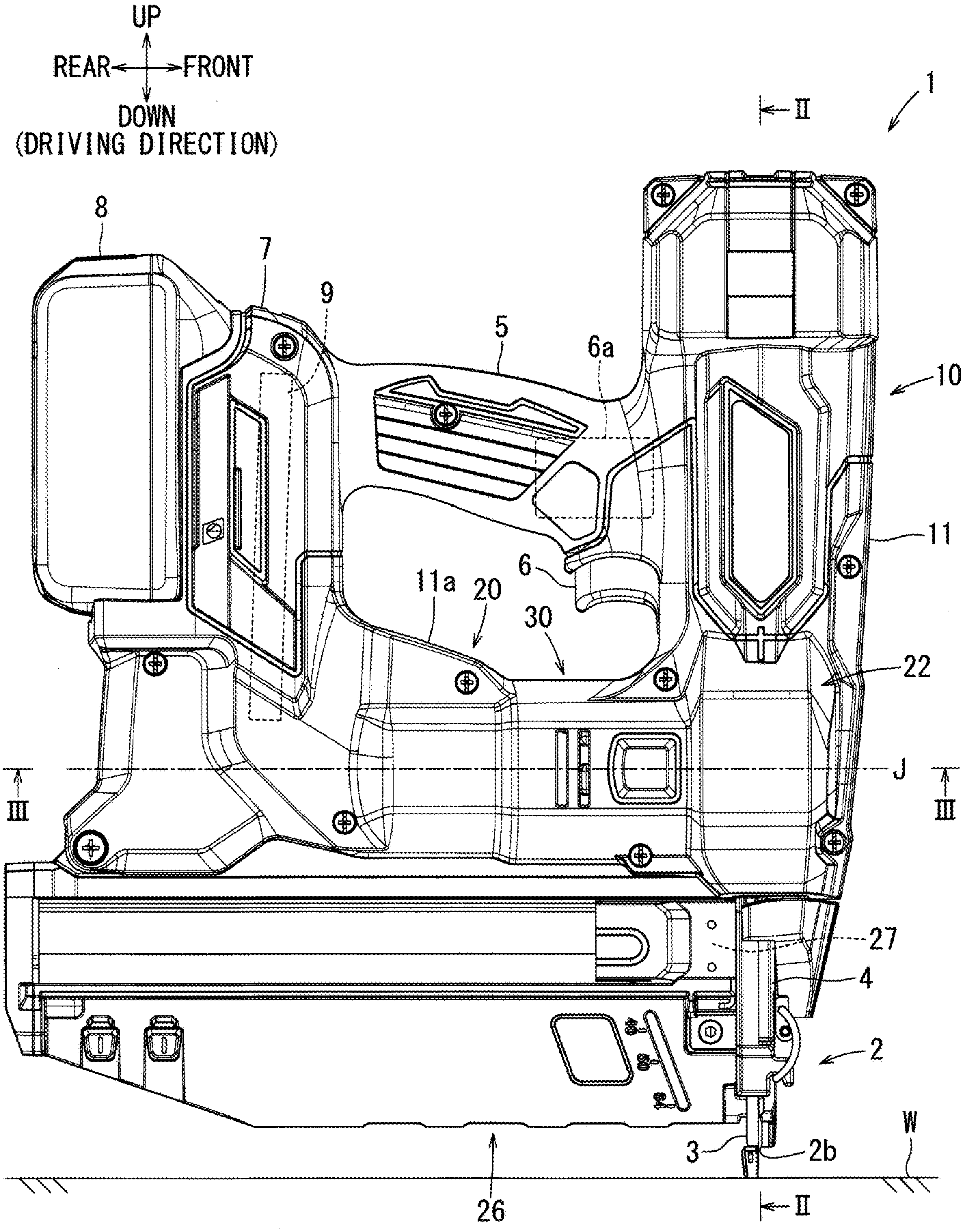
FIG. 1 is a right side view of an electric power tool according to a first embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to one aspect of the present disclosure, the electric power tool further comprises a retaining member that surround the outer ring to retain the outer ring, and a protrusion as an eccentric mechanism. The protrusion is arranged in one of the outer ring or the retaining member. The protrusion protrudes toward and contacts the other. Because of this configuration, the outer ring and the inner circumferential member are made eccentric to each other by a simple structure. Accordingly, the rotation direction restriction mechanism, which reliably restricts the rotation direction in one direction, can be obtained without a large modification of the prior structure.

According to another aspect of the present disclosure, the inner circumferential member is rotatable by the electric motor. The outer ring includes an inner circumferential surface which is made eccentric relative to a rotation center of the inner circumferential member. For example, when the inner circumferential member rotates, the inner circumferential surface of the outer ring and the outer circumferential surface of the inner circumferential member are made eccentric to each other while an axial symmetry of the inner circumferential member stays still. Thus, the inner circumferential member is restricted from being unsteadily rotated and being able to rotate in one direction.

According to another aspect of the present disclosure, the inner circumferential member is rotatable by the electric motor. The inner circumferential member includes an outer circumferential surface which is made eccentric relative to a rotation center of the inner circumferential member. The outer ring is assembled in the same manner as the prior art configurations. The inner circumferential surface of the outer ring and the outer circumferential surface of the inner circumferential member are made eccentric to each other such that the inner circumferential member rotates only in one direction.

According to another aspect of the present disclosure, the inner circumferential member includes the plurality of cam surfaces. When the inner circumferential member rotates, the lock member smoothly moves along a corresponding cam surface owing to a centrifugal force of the inner circumferential member. Thus, allowance of rotation in the first direction and restriction in the second direction can be reliably performed.

According to another aspect of the present disclosure, the electric power tool further comprises a retaining member that surrounds the outer ring and restricts a rotation of the outer ring. The inner circumferential member is driven to rotate by the electric motor. The outer ring is arranged so as not to be rotatable integrally with the retaining member, and the inner circumferential member is arranged as a member that is rotated by the electric motor. Thus, the rotation direction restriction mechanism can be arranged, for example, in the gear train which reduces and transmits an output of the electric motor.

According to another aspect of the present disclosure, the electric power tool further comprises a planetary gear mechanism for reducing an output rotation speed of the electric motor. The planetary gear mechanism includes planetary gears rotatably held by the inner circumferential member. Accordingly, the rotation direction restriction mechanism which reliably restricts rotation direction in one direction can be formed in the planetary gear mechanism which includes a lot of components with a small spacing.

According to another aspect of the present disclosure, the planetary gear mechanism includes an internal gear engageable with the planetary gears. The internal gear and the outer ring are housed in parallel arrangement in a gear case. An outer diameter of the outer ring is smaller than that of the internal gear. Because of this configuration, a clearance is formed between the outer circumferential surface of the outer ring and the inner circumferential surface of the gear case. A center of the internal gear is positioned at a center of the gear case. Thus, the outer ring can be made eccentric relative to the center of the internal gear by the clearance.

According to another aspect of the present disclosure, the electric power tool further comprises a planetary gear mechanism for reducing the output speed of rotation of the electric motor. The planetary gear mechanism includes an upstream-side internal gear, upstream-side planetary gears that engage the upstream-side internal gear, a downstream-side internal gear, and downstream-side planetary gears that engage the downstream-side internal gear. The upstream-side internal gear, the outer ring and the downstream-side internal gear are housed in a gear case in this order. The gear case includes the protrusion as the eccentric mechanism which protrudes toward and contacts the outer ring. Also, the protrusion makes a part of an inner diameter of the gear case smaller than an outer diameter of the upstream-side internal gear and an outer diameter of the downstream-side internal gear.

Because of this configuration, the outer ring can be assembled to the gear case together with each of the components of the planetary gear mechanism. Furthermore, the protrusion of the gear case can be prevented from interfering with components except the outer ring such as, for example, the upstream-side internal gear and the downstream-side internal gear. Accordingly, only the outer ring can be made eccentric relative to the motor axis line, which corresponds to the rotation center of the inner circumferential member, without preventing driving of the planetary gear mechanism.

According to another aspect of the present disclosure, the electric power tool further comprises a lift mechanism for storing output energy by the electric motor, and a driver that is movable in a driving direction owing to the output energy stored in the lift mechanism for driving a driving member. Accordingly, the lift mechanism stores energy owing to a forward rotation of the lift mechanism. If the lift mechanism rotates in a reverse direction by the output energy, a part of the stored energy is lost, which causes a driving operation not to be fully performed. The rotation direction restriction mechanism allows the lift mechanism to rotate only in a forward direction, which restricts the stored energy from being lost unpreparedly.

According to another aspect of the present disclosure, the electric power tool further comprises a planetary gear mechanism for reducing the output rotation speed of the electric motor. The planetary gear mechanism includes an upstream-side internal gear, upstream-side planetary gears that engage the upstream-side internal gear, a downstream-side internal gear, and downstream-side planetary gears that engage the downstream-side internal gear. The downstream-side internal gear is arranged on a downstream side of the rotation direction restriction mechanism. Accordingly, the output speed of the electric motor can be reduced in the downstream-side internal gear on the downstream side of the rotation direction restriction mechanism. That is, the rotation direction restriction mechanism can restrict the rotation direction in one direction in a stage where an output torque of the electric motor is not so large. Because of this configuration, the rotation direction can be reliably restricted by the rotation direction restriction mechanism.

Next, a first embodiment according to the present disclosure will be explained with reference to FIGS. 1 to 10. A gas-spring type driving tool is exemplified as one example of an electric power tool 1 which utilizes a pressure of the gas filled in the accumulation chamber as a thrust power to drive a driving member. In the following explanation, a driving direction to drive a driving member is referred to as a downward direction and a direction opposite to the driving direction is referred to as an upward direction. A user of the electric power tool is situated on a left side of the electric power tool 1 shown in FIG. 1. The user is in a rear direction and a direction opposite to the user side is a forward direction. A leftward/rightward direction is based on the user's position.

Figure 2:
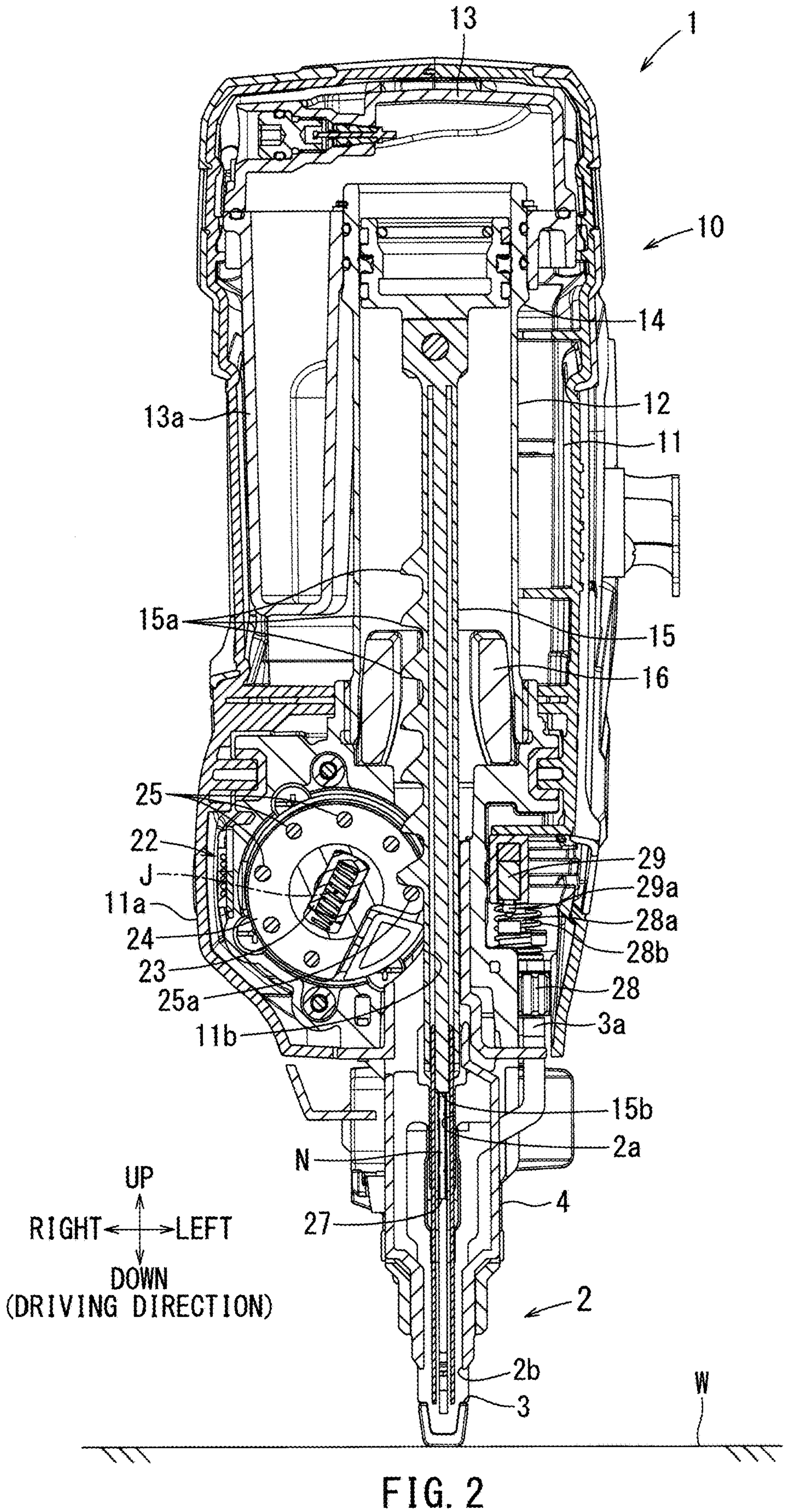
FIG. 2 is a cross-sectional view taken along line II-II of FIG. 1, showing that a driver is at a standby position.

As shown in FIG. 2, the electric power tool 1 includes a tool main body 10 and a main body housing 11 that covers the tool main body 10. The main body housing 11 includes a cylinder 12 extending in an up-down direction. A piston 14 is housed in an interior of the cylinder 12 so as to be reciprocatable in the up-down direction. A driver 15 extending in the up-down direction is connected to a lower surface of the piston 14. An upper end of the cylinder 12 communicates with an accumulation chamber 13. A compression gas such as, for example, air is filled in the accumulation chamber 13. A pressure of the gas filled in the accumulation chamber 13 serves a trust force applied to an upper surface of the piston 14 for moving the piston 14 in the downward direction. A right portion of the accumulation chamber 13 communicates with an air chamber 13*a* extending in the downward direction. The air chamber 13*a* extends downward along a right side surface of the cylinder 12. The air chamber 13*a* is above a lift mechanism 22 overlapping with a part of the lift mechanism 22 in the left-right direction. The lift mechanism 22 is discussed 22 later in detail.

As shown in FIGS. 1 and 2, a driving nose 2 is arranged at a lower portion of the tool main body 10. The driving nose 2 includes a driver guide 4 extending in the up-down direction. A driving passage 2*a* extending in the up-down direction is arranged in an interior of the driver guide 4. A lower end of the driving passage 2*a* opens downward as an ejection port 2*b*. The driving nose 2 includes a contact arm 3 that is contactable to a workpiece W. The contact arm 3 is movable in the up-down direction relating to the driver guide 4. The contact arm 3 is spring-biased in a downward direction by a compression spring 28*b* that is arranged at a front portion of the tool main body 10. When a lower end of the contact arm 3 contacts and brings close to the workpiece W, the contact arm 3 moves upward by being pushed by the workpiece W.

As shown in FIG. 2, a lower portion of the driver 15 enters the driving passage 2*a*. The driver 14 moves downward owing to a pressure of the gas filled in the accumulation chamber 13 which acts on an upper surface of the piston 14. When a tip end 15*b* of the driver 15 moves to a driving position, the tip end 15*b* of the driver 15 drives a head of one driving member N that is supplied into the driving passage 2*a*. The driving member N driven by the driver 15 ejects from the ejection port 2*b* to be driven into the workpiece W. An approximately tubular-shaped damper 16 is arranged on a lower side of the interior of the cylinder 12 so as to absorb an impact of the piston 14 at a dead center of the electric power tool 1.

As shown in FIG. 2, a plurality of rack teeth (engaged portions) 15*a* protruding rightward are formed on a right side of the driver 15. In the first embodiment, seven rack teeth 15*a* are arranged in a longitudinal direction of the driver 15, i.e., in the up-down direction. Each of the rack teeth 15*a* is formed in an approximately triangular-shape with a bottom portion thereof facing in the driving direction (downward) when viewed from the front. The bottom portion of each of the rack teeth 15*a* engages a corresponding engagement portion 25 of the lift mechanism 22.

As shown in FIG. 1, a grip 5 for a user to hold is arranged at a rear portion of the tool main body 10. The grip 5 extends rearward. A trigger 6 for the user to pull with the user's fingertip is arranged on a lower surface of the front portion of the grip 5. A trigger switch 6*a* is arranged in an interior of the grip 5. The trigger 6*a* is turned on/off according to a pulling operation of the trigger 6. When the driving nose 2 moves upward by being pressed by the workpiece W, the pulling operation of the trigger 6 becomes effective.

As shown in FIG. 1, a battery attachment portion 7 extending in the up-down direction is arranged on a rear surface of the grip 5. A battery 8 is removably attachable to the battery attachment portion 7. The battery 8 detached from the battery attachment portion 7 can be recharged by an dedicated charger for repeated use. The battery 8 can be used as a power source for other electric power tools. The battery 8 supplies power to an electric motor 20 etc. A controller 9 for mainly controlling the electric motor 20 is housed within the battery attachment portion 7. The controller 9 includes a shallow rectangular box-shaped case including a control circuit board. The controller 9 is arranged in front of the battery 8 attached to the battery attachment portion 7. The controller 9 is arranged such that the longest side thereof extends approximately in the up-down direction and the shortest side in the front-rear direction.

As shown in FIG. 1, the main body housing 11 includes an approximately tubular-shaped mechanism case 11*a* extending in the front-rear direction below the grip 5. A rear portion of the mechanism case 11*a* is connected to a lower portion of the battery attachment portion 7. The grip5, the battery attachment portion 7 and the mechanism case 11*a* cooperate with each other to form a loop shape. The mechanism case 11 houses the electric motor 20, a planetary gear mechanism 30 and a lift mechanism 22 in this order from rear to front. The electric motor 20, the planetary gear mechanism 30 and the lift mechanism 22 are arranged in the front-rear direction in which a motor axis line J extends.

Figure 3:
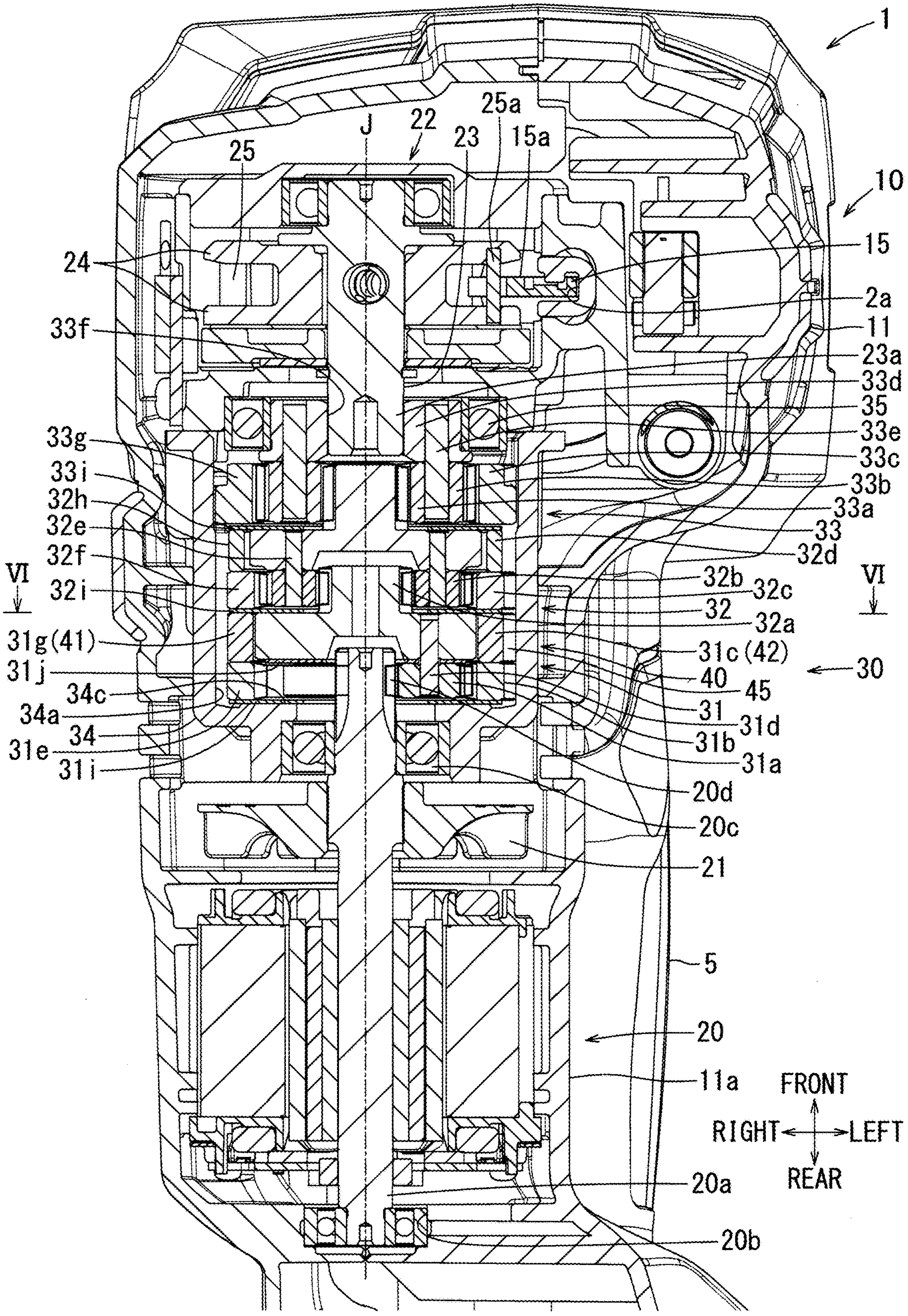
FIG. 3 is a cross-sectional view taken along line III-III in FIG. 1.

As shown in FIG. 3, the electric motor 20 includes a motor shaft 20*a* having the motor axis line J extending in the front-rear direction. A rear portion of the motor shaft 20*a* is rotatably supported by a bearing 20*b*. Also, a front portion of the motor shaft 20*a* is rotatably supported by a bearing 20*c* arranged in a rear portion of the planetary gear mechanism 30. A fan 21 is attached to a front portion of the motor shaft 20*a* behind the bearing 20*c*. When the motor shaft 20*a* rotates together with the fan 21, a cooling air flows within the mechanism case 11*a* from the rear to the front. A drive gear 20*d* engaging the planetary gear mechanism 30 is arranged at a front end of the motor shaft 20*a*.

Figure 4:
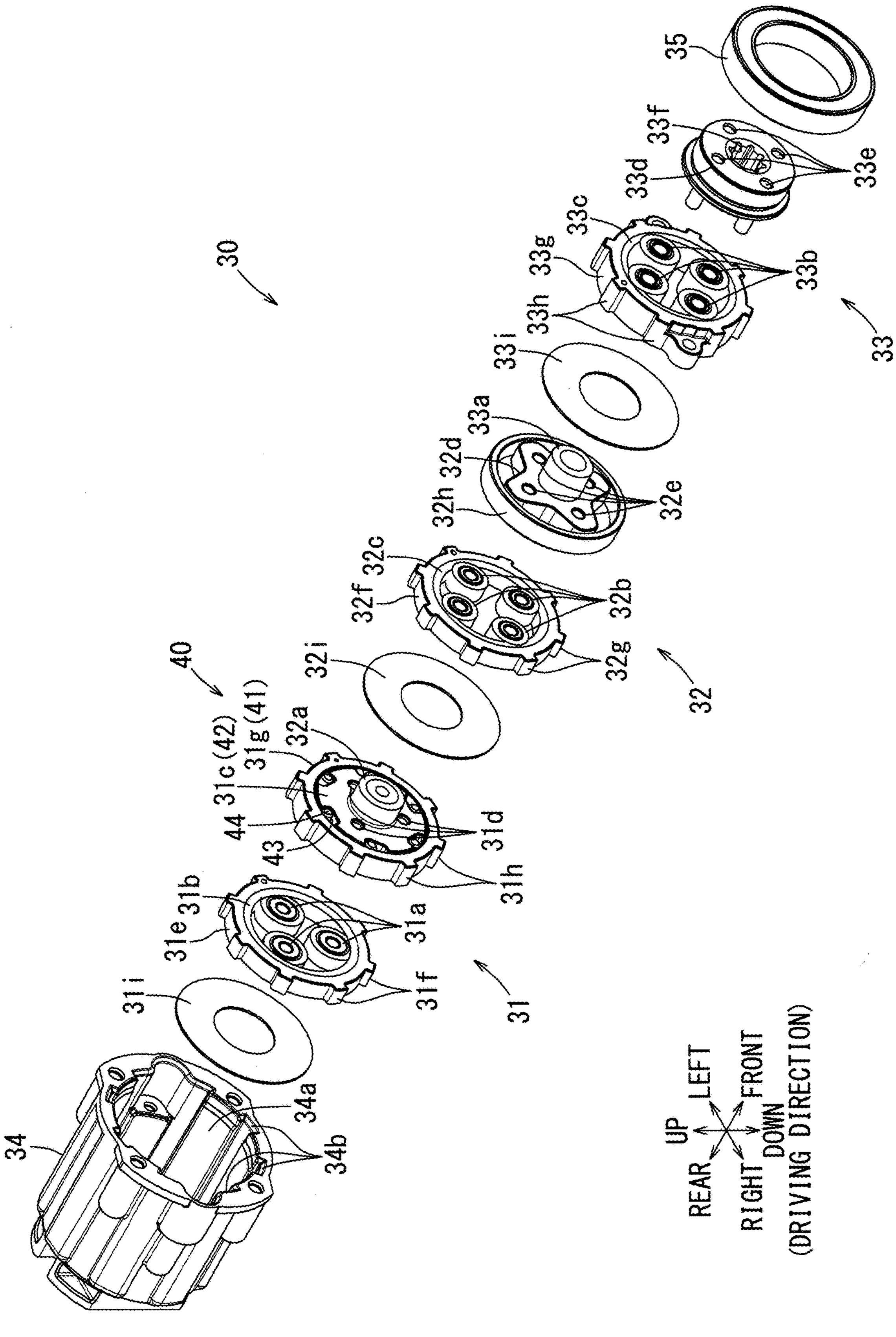
FIG. 4 is an exploded perspective view of a planetary gear mechanism.

As shown in FIGS. 3 and 4, the planetary gear mechanism 30 includes three-staged gear trains, i.e., a first planetary gear train 31, a second planetary gear train 32 and a third planetary gear train 33. The first, second and third planetary gear trains 31, 32, 33 are arranged coaxially with each other and the motor axis line J. A rotation output of the electric motor 20 is reduced by the planetary gear mechanism 30 including the first, second and third planetary gear trains 31, 32, 33 for transmitting to the lift mechanism 22. The planetary gear mechanism 30 includes a gear case 34 for housing the first, second and third planetary gear trains 31, 32, 33. The gear case 34 is made of, for example, resin. The gear case 34 is held firmly within the mechanism case 11*a*. An approximately cylindrical-shaped inner circumferential surface 34*a* of the gear case 34 includes a plurality of engagement recesses 34*b*. The plurality of engagement recesses 34*b* are recessed toward radially outside and extend in the front-rear direction from a bottom surface 34*c* of the gear case to a front end thereof.

As shown in FIGS. 3 and 4, the first planetary gear train 31 includes three planetary gears 31*a*, an internal gear 31*b* and a carrier 31*c*. The three planetary gears 31*a* engage the drive gear 20*d* of the motor shaft 20*a*. The drive gear 20*d* corresponds to a sun gear of the first planetary gear train 31.

An approximately cylindrical-shaped outer circumferential gear member 31*a* includes a plurality of protrusions 31*f* which extends radially outward. The cylindrical-shaped outer circumferential gear member 21*a* is arranged on an outer circumferential side of the internal gear 31*b*. The outer circumferential gear member 31*a* is housed along the inner circumferential surface 34*a* of the gear case 34. Inserting the plurality of protrusion 31*f* into the engagement recesses 34*b* of the gear case 34 prevents the internal gear 31*b* from rotating relating to the gear case 34.

As shown in FIGS. 3 and 4, the three planetary gears 31*a* engage the internal gear 31*b*. The three planetary gears 31*a* are rotatably supported by the carrier 31*c* via support shafts 31*d*. A washer 32*j* is arranged behind the three planetary gears 31*a* and the internal gear 31*b*.

As shown in FIGS. 3 and 4, an approximately cylindrical-shaped outer circumferential carrier member 31*g* including a plurality of protrusions 31*h* protruding radially outward. The cylindrical-shaped outer circumferential carrier member 31*g* is arranged on an outer circumferential side of the carrier 31*c*. The outer circumferential carrier member 31*g* is housed along the inner circumferential surface of the gear case 34. Inserting the plurality of protrusions 31*h* into the engagement recesses 34*b* of the gear case 34 prevents the outer circumferential carrier member 31*g* from rotating relating to the gear case 34. The planetary gear mechanism 30 includes a rotation direction restriction mechanism 40 including the carrier 31*c* and the outer circumferential carrier member 31*g*. The rotation direction restriction mechanism 40 allows the rotation output of the electric motor 20 to rotate in a first direction (counterclockwise when viewed from the front) and restricts in a second direction opposite to the first direction. The rotation direction restriction mechanism 40 will be discussed later.

As shown in FIGS. 3 and 4, a sun gear 32*a* of the second planetary gear train 32 is integrally formed in a front surface of the carrier 31*c* of the first planetary gear train 31. The second planetary gear train 32 includes four planetary gears 32*b*, one internal gear 32*c* and one carrier 32*d*. The four planetary gears 32*b* engage the sun gear 32*a*. An approximately cylindrical-shaped outer circumferential gear member 32*f* including a plurality of protrusions 32*g* extending radially outward is arranged on an outer circumferential side of the internal gear 32*c*. The outer circumferential gear member 32*f* is housed along the inner circumferential surface 34*a* of the gear case 34. Inserting the plurality of protrusions 32*g* into the engagement recesses 34*b* of the gear case 34 prevents the internal gear 32*c* from rotating relating to the gear case 34.

As shown in FIGS. 3 and 4, the four planetary gears 32*b* engage the internal gear 32*c*. The four planetary gears 32*b* are rotatably supported by a carrier 32*d* via support shafts 32*e*. A washer 32*j* is arranged behind the four planetary gears 32*b* and the internal gear 32*c*. A cylindrical-shaped outer circumferential carrier member 32*h* is arranged on an outer circumferential side of the carrier 32*d*. The outer circumferential carrier member 32*h* is housed in the inner circumferential surface 34*a* of the gear case 34. The outer circumferential carrier member 32*h* restricts a position of the planetary gear train 32 relative to the planetary gear train 33 in the direction of the motor axis line J.

As shown in FIGS. 3 and 4, a sun gear 33*a* of the third planetary gear train 33 is integrally formed in a front surface of the carrier 32*d* of the second planetary gear train 32. The third planetary gear train 33 includes four planetary gears 33*b*, one internal gear 33*c* and one carrier 33*d*. The four planetary gears 33*b* engage the sun gear 33*a*. An approximately cylindrical-shaped outer circumferential gear member 33*g* including a plurality of protrusions 33*h* extending radially outward. The cylindrical-shaped outer circumferential gear member 33*g* is arranged on an outer circumferential side of the internal gear 33*c*. The outer circumferential gear member 33*g* is housed along the inner circumferential surface 34*a* of the gear case 34. Inserting the plurality of protrusions 33*h* into the engagement recesses 34*b* of the gear case 34 prevents the internal gear 33*c* from rotating relating to the gear case 34.

As shown in FIGS. 3 and 4, the four planetary gears 33*b* engage the internal gear 33*c*. The four planetary gears 33*b* are rotatably supported by a carrier 33*d* via support shafts 33*e*. A washer 33*j* is arranged behind the four planetary gears 33*b* and the internal gear 33*c*. Spline grooves 33*f* are formed in the middle of the carrier 33*d*. A spline shaft 23*a* arranged at a rear end of a rotation shaft 23 of the lift mechanism 22 is inserted so as to be fitted to the spline grooves 33*f*. Because of this configuration, the carrier 33*d* is rotatable integrally with the rotation shaft 33*d*. A bearing 35 that rotatably supports the carrier 33*d* together with the rotation shaft 23 is arranged on an outer circumferential side of the carrier 33*d*.

As shown in FIG. 2, the lift mechanism 22 is arranged on a right side of the driving nose 2. The lift mechanism 22 moves the driver 15 together with the piston 14 in an upward direction against the pressure of air filled in the accumulation chamber 13. The lift mechanism 22 includes the rotation shaft 23 rotatable around the motor axis line J. A wheel 24 is attached to the rotation shaft 23 so as to be rotatable around the motor axis line J. Referring to FIG. 3, the rotation direction restriction mechanism 40 allows the wheel 24 to rotate counterclockwise and restricts clockwise when viewed from the front. A plurality of engagement portions 25 are arranged along an outer circumferential edge of the wheel 24. In the present embodiments, for example, seven engagement portions 25 are arranged at specified intervals in a circumferential direction of the wheel 24. Also, for example, a cylindrical-shaped pin extending in the front-rear direction is used for each of the engagement portions 25. When the wheel 24 rotates, each of the plurality of engagement portions 25 rotates around the motor axis line J.

As shown in FIG. 2, a left portion of the wheel 24 enters an interior of the driving passage 2*a* of the driver guide 4 via a window 11*b* arranged on the left side of the mechanism case 11*a*. Each of the plurality of engagement portions 25 of the wheel 24 engages a bottom portion of a corresponding rack tooth 15*a* of the driver 15 within the driving passage 2*a*. In a state where at least one of the plurality of engagement portions 25 engages a bottom surface of the corresponding rack tooth 15*a*, the wheel 24 rotates counterclockwise when viewed from the front, thereby moving the driver 15 and the piston 14 upward. The pressure of the gas filled in the accumulation chamber 13 increases owing to an upward movement of the piston 14.

As shown in FIG. 2, a dial-type adjuster 28 is arranged on a frontward left side of the driving nose 2. The adjuster 28 includes a rotation shaft 28*a* extending in the up-down direction. The rotation shaft 28*a* is rotatable integrally with the adjuster 28 and movable in the up-down direction. An adjuster connection portion 3*a* connected to the adjuster 28 is arranged above the contact arm 3. The contact arm 3 is movable integrally with the adjuster 28 in the up-down direction. When the adjuster 28 rotates around its axis, a position of the contact arm 3 can be adjusted in the up-down direction. The adjuster 28 includes a compression spring 28*b* that is arranged on an outer circumferential side of the rotation shaft 28*a* and supported by the main body housing 11. The compression spring 28*b* biases the adjuster 28 and the contact arm 3 in a downward direction.

As shown in FIG. 2, a switch 29 is arranged above the adjuster 28. When the contact arm 3 moves upward, the adjuster 28 pushes a projection pin 29*a* of the switch 29 via a spring (not shown). When the switch 29 is turned on, the switch 29 transmits an on-signal to a controller 9. When the controller 9 transmits the on-signal, a pulling operation of the trigger 6 becomes effective (refer to FIG. 1). On the contrary, when the contact arm is biased downward, the projection pin 29*a* of the switch 29 is not pushed by the adjuster 28. When the switch 29 does not transmit the on-signal, the pulling operation of the trigger 6 does not become effective.

As shown in FIG. 1, an approximately rectangular box-shaped magazine 26 is arranged behind the driving nose 2. The magazine 26 extends straight in a rearward direction from the driver guide 4. The magazine 26 is loaded with a plurality of driving members N each of which extends in the up-down direction and is arranged in parallel to each other in the front-rear direction. A pusher 27 for supplying a driving member N to the driving passage 2*a* is arranged inside of the magazine 26. The pusher 27 is biased in a forward direction by a spiral spring (not shown). A front surface of the pusher 27 pushes the driving members N housed in the magazine 26 toward the driving passage 2*a*. Accordingly, the driving members N are supplied forward from within the magazine 26 toward the driving passage 2*a* one by one.

Figure 5:
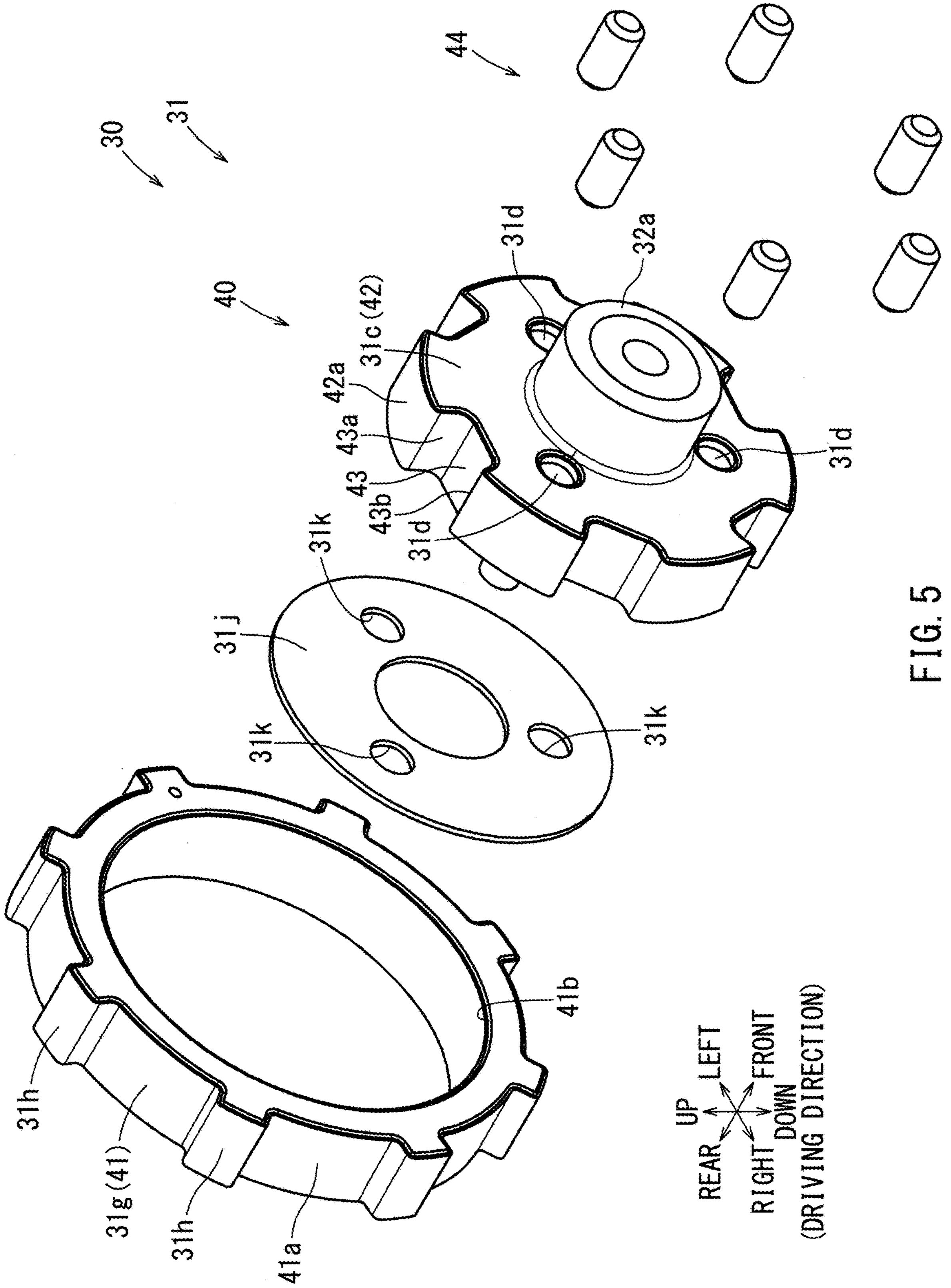
FIG. 5 is an exploded perspective view of a rotation direction restriction mechanism.
Figure 6:
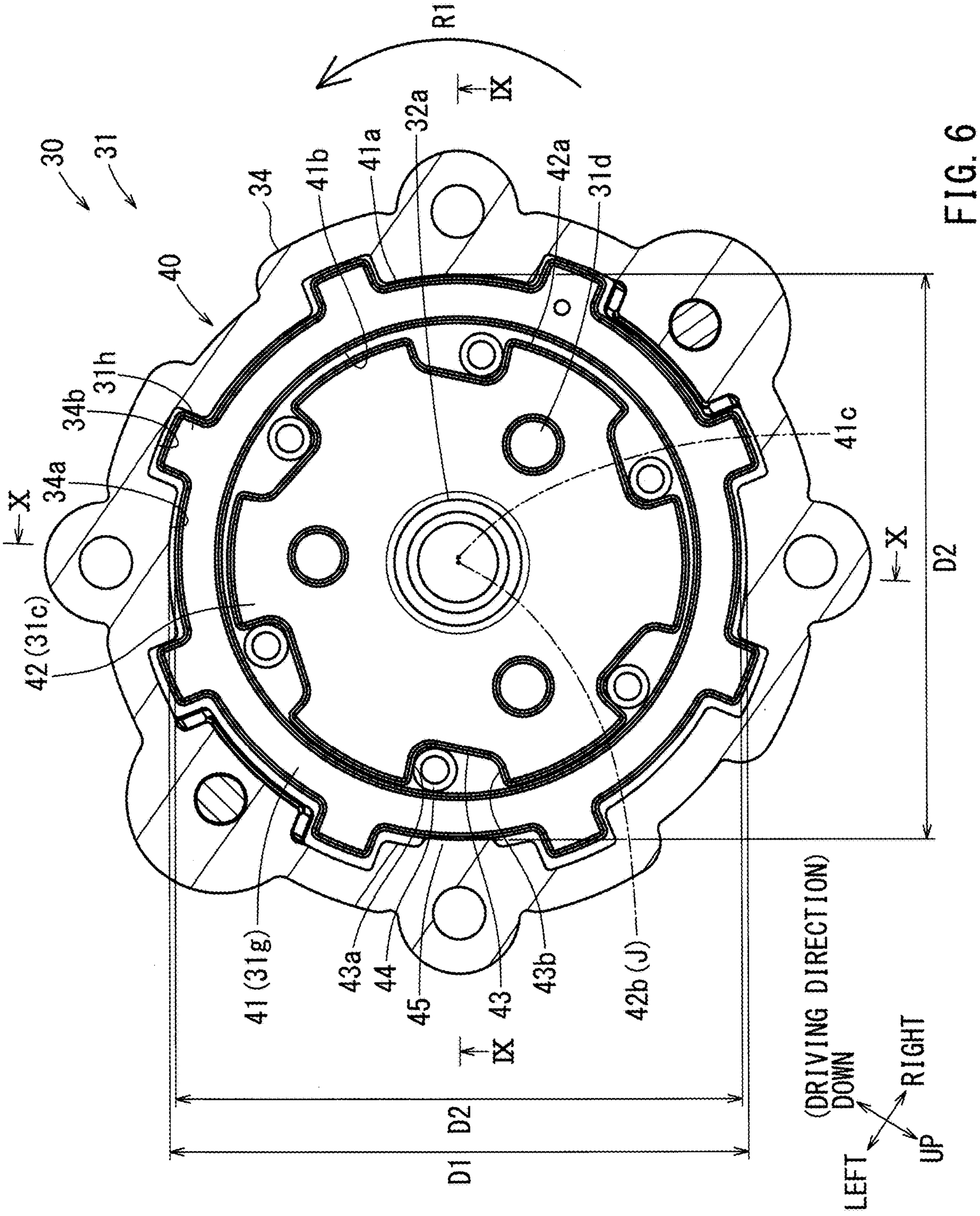
FIG. 6 is a cross-sectional view taken along line VI-VI of FIG. 3, showing that the rotation direction restriction mechanism rotates in a normal direction.

As shown in FIGS. 3, 5 and 6, the rotation direction restriction mechanism 40 includes an approximately cylindrical-shaped outer ring 41 and an approximately disc-shaped inner circumferential member 42 arranged inside of the outer ring 41. In the present embodiments, the outer ring 41 is the outer circumferential carrier member 31*g* of the first planetary gear train 31. Also, in the present embodiments, the inner circumferential member 42 is the carrier 31*c* of the first planetary gear train 31. The inner circumferential member 42 is housed inside of the outer ring 41. An inner circumferential surface 41*b* of the outer ring 41 radially faces an outer circumferential surface 42*a* of the inner circumferential member 42.

As shown in FIGS. 3 and 6, an outer circumferential surface 41*a* of the outer ring 41*a* radially faces the inner circumferential surface 34*a* of the gear case 34. An inner diameter of the inner circumferential surface 34*a* of the gear case 34 without the engagement recess 34*b* approximately equals to an outer diameter D1 of the internal gear 31*b* (refer to FIG. 9). An outer diameter D2 of the outer circumferential surface 41*a* of the outer ring 41 without the protrusion 31*h* is slightly shorter than the outer diameter D1. Because of this configuration, a slight clearance is formed between the outer circumferential surface 41*a* of the outer ring 41 and the inner circumferential surface 34*a* of the gear case 34.

As shown in FIGS. 5 and 6, the rotation direction restriction mechanism 40 includes a plurality of cam surfaces 43. The plurality of cam surfaces 43 are recessed radially inward from the outer circumferential surface 42*a* of the inner circumferential member 42. The plurality of cam surfaces 43 are formed at approximately equal intervals in a circumferential direction of the outer circumferential surface 42*a*. For example, six cam surfaces 43 are formed at intervals of 60 degrees on the outer circumferential surface 42*a*. A rock member 44 is inserted within each of the cam surfaces 43. Each of the rock members 44 is, for example, a cylindrical-shaped pin having the same length as a thickness of the inner circumferential member 42 in the front-rear direction. A washer 31*j* is behind the inner circumferential member 42 and the lock members 44. The washer 31*j* includes three holes 31*k* for inserting three supporting shafts 31*d* extending rearward from the inner circumferential member 42.

Figure 7:
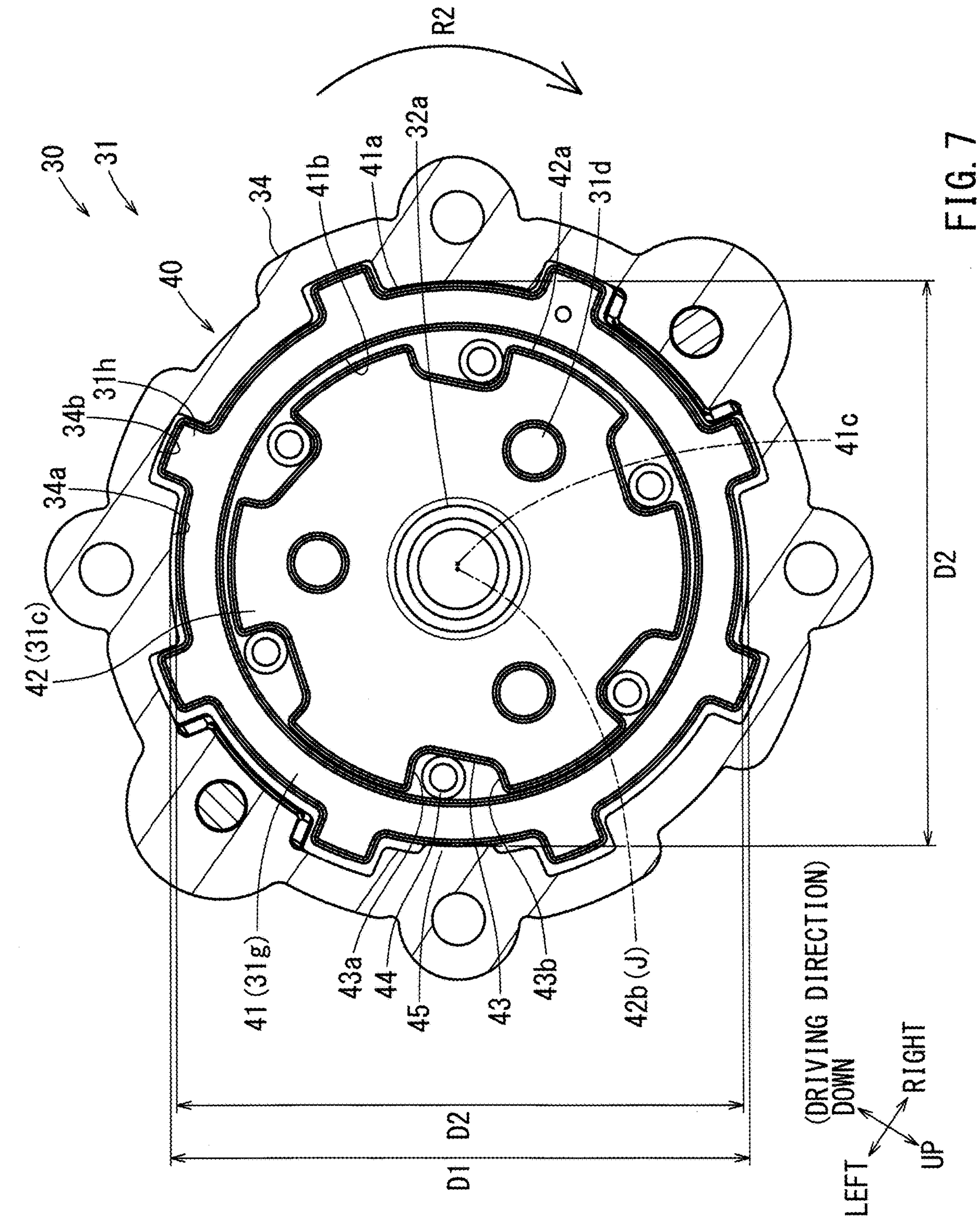
FIG. 7 is a cross-sectional view similar to FIG. 6, showing that the rotation restriction mechanism starts to restrict rotating in a reverse direction.

As shown in FIGS. 5 to 7, each of the cam surfaces 43 is formed asymmetrically in the circumferential direction of the inner circumferential member 42. In more detail, each of the cam surfaces 43 on a side in a first direction R1 (counterclockwise viewed from the front) includes a narrow width portion 43*b* having a narrow width in a radial direction of the inner circumferential member 42. On the contrary, each of the cam surfaces 43 on a side in a second direction (clockwise direction viewed from the front) includes a wide width portion 43*a* having a wide width in the radial direction of the inner circumferential member 42. The width of the wide width portion 43*a* is larger than a diameter of the rock member 44. The width of the narrow width portion 43*b* is smaller than the diameter of the rock member 44.

Figure 9:
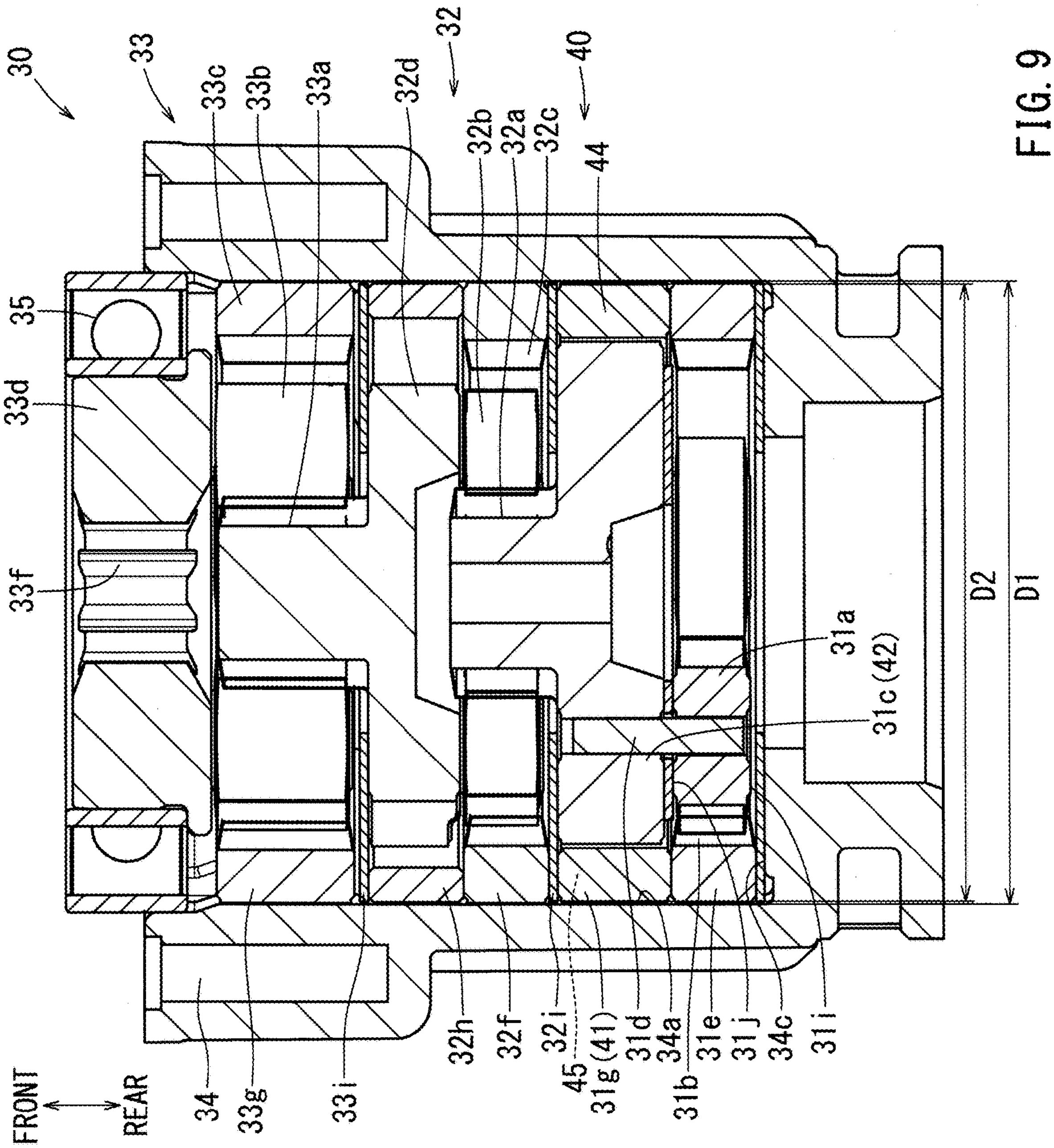
FIG. 9 is a cross-sectional view of the planetary gear mechanism taken along line IX-IX in FIG. 6.

As shown in FIGS. 3, 6 and 9, the rotation direction restriction mechanism 40 includes an eccentric mechanism 45 by which the outer ring 41 and the inner circumferential member 42 are made eccentric to each other. In the first embodiment, the eccentric mechanism 45 includes a projection 45 projecting radially inward from the inner circumferential surface 34*a* of the gear case 34. A length between a tip end of the projection 45 and the inner circumferential surface 34*a* of the gear case 34 facing the tip end of the projection 45 approximately equals to the outer diameter D2 of the outer ring 41 without the engagement recesses 31*h*. The outer ring 41 is made eccentric in a projecting direction of the projection 45 relating to the gear case 34 and the inner circumferential member 42. Because of this configuration, a center 41*c* of the inner circumferential surface of the outer ring 41 is offset in the projection direction of the projection 45 relating to the motor axis line J which is a rotation center 42*b* of the inner circumferential member 42.

Figure 10:
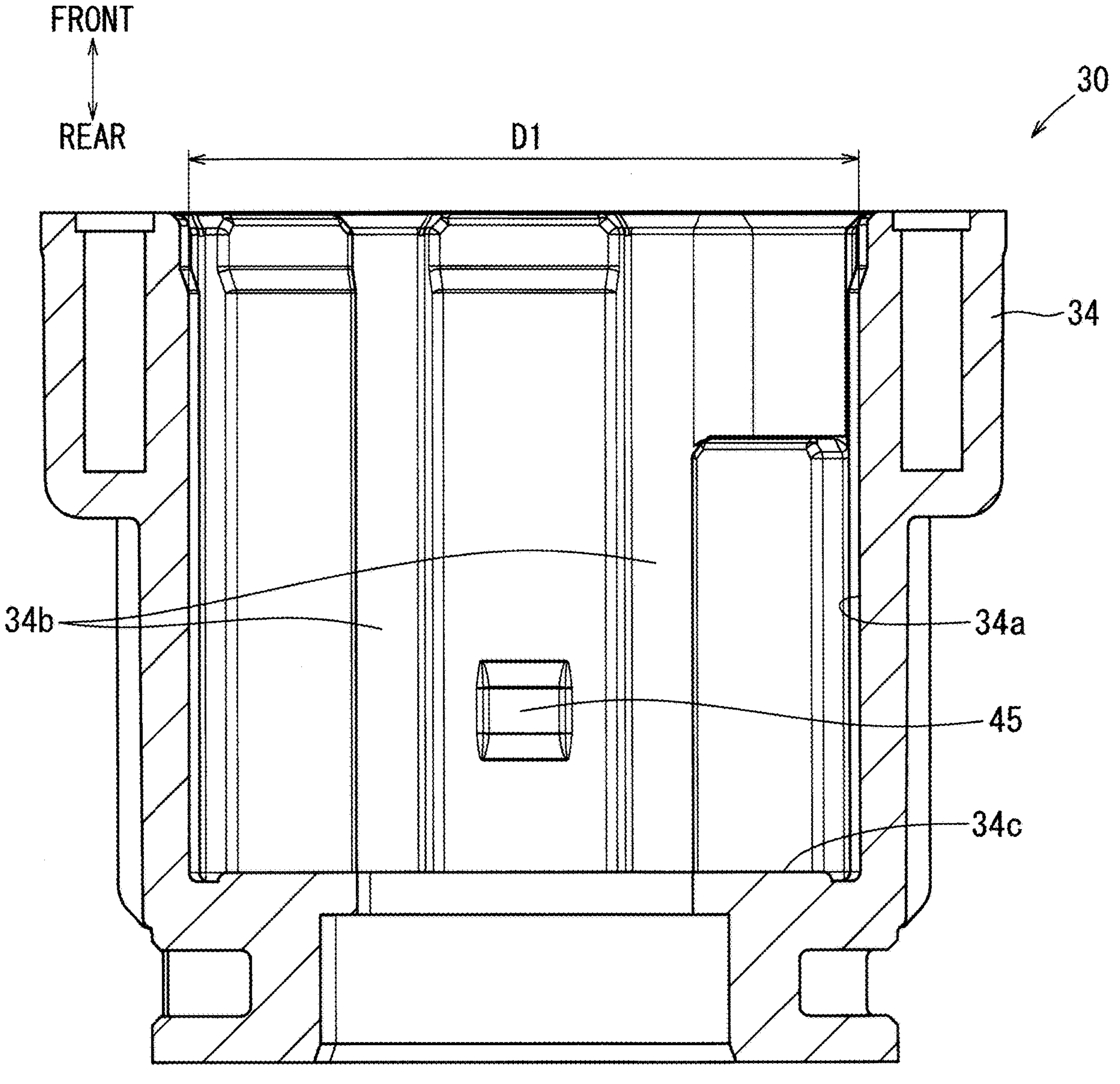
FIG. 10 is a cross-sectional view of a gear case taken along line X-X in FIG. 6.

As shown in FIGS. 3 and 10, the protrusion 45 is formed in an approximately rectangular shape in a side view. The protrusion 45 is formed in a position where the outer ring 41 is positioned radially inside of the protrusion 45. In other words, the protrusion 45 is not formed in front of and behind the outer ring 41 in the front-rear direction on the inner circumferential surface 34*a* of the gear case 34. Each component of the planetary gear mechanism 30 is assembled to the gear case 34 from a bottom surface 34*c* of the gear case. The planetary gears 31*a* and the internal gear 31*b* on an upstream side, which are positioned on the upstream side of the outer ring 41, are assembled to the gear case 34 before the outer ring 41 is assembled to the gear case 34. The gear case 34 is made of resin and thus it is easy to be resiliently deformed. Also, the protrusion 45 has a short protruding length. Accordingly, the internal gear 31*b* on the upstream side can be assembled to the gear case 34 over the protrusion 45. The internal gear 31*b* on the upstream side assembled to the gear case 34 is firmly held behind the protrusion 45 without being interfered with the protrusion 45.

As shown in FIG. 3, the planetary gears 32*b* and the internal gear 32*c*, which is positioned on a downstream side of the outer ring 41, is assembled to the gear case 34 after the outer ring 41 is assembled to the gear case 34. The internal gear 32*c* on the downstream side assembled to the gear case 34 is firmly held in front of the protrusion 45 without being interfered with the protrusion 45.

Figure 8:
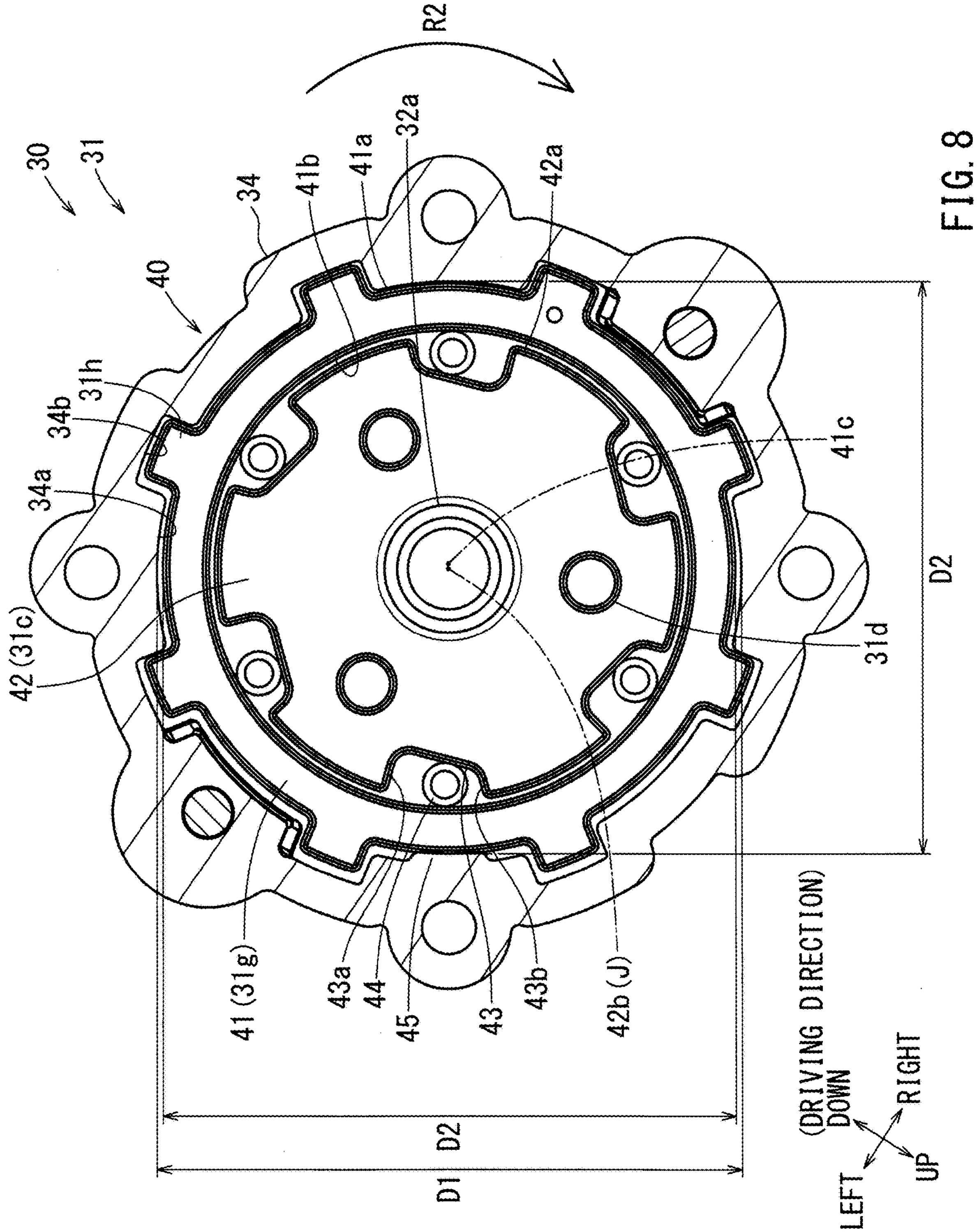
FIG. 8 is a cross-sectional view similar to FIG. 6, showing a state after the rotation restriction mechanism restricts rotating in the reverse direction.

As shown in FIGS. 6 to 8, when the outer ring 41 and the inner circumferential member 42 are made eccentric to each other, a radial distance between each of the cam surfaces 43 and the inner circumferential surface 41*b* of the outer ring 41 differs from each other. In more detail, a radial distance between the cam surface 43 on a side of the protrusion 45 (on the left side of the figures) and the inner circumferential surface 41*b* of the outer ring 41 is small. On the contrary, a radial distance between the cam surface 43 on a side opposite to the protrusion 45 (on the right side of the figures) and the inner circumferential surface 41*b* of the outer ring 41 is large.

As shown in FIG. 6, when the inner circumferential member 42 rotates in the first direction R1, each of the lock members 44 moves to a side of the wide width portion 43*a* of each of the cam surfaces 43. Because of this configuration, there is a clearance between each of the lock members 44 and the inner circumferential surface 41*b* of the outer ring 41. Accordingly, the lock member 44 does not prevent the inner circumferential member 42 from rotating in the first direction. In other words, the inner circumferential member 42 is allowed to rotate in the first direction.

As shown in FIGS. 7 and 8, when the inner circumferential member 42 starts to rotate in the second direction, each of the lock members 44 moves to a side of the narrow width portion 43*b* of each of the cam surfaces 43. Especially, with regard to the cam surface 43 on a side of the protrusion 45 (on the left side of the figures), the lock member 44 is bitten (and/or engaged) between the cam surface 43 and the inner circumferential surface 41*b*. For example, when three or more lock members 44 are bitten (engaged) between the cam surfaces 43 and the inner circumferential surfaces 41*b* of the outer ring 41, rotation of the inner circumferential member 42 is restricted. In more detail, when the rotation center 42*b* of the inner circumferential member 42 is located inside of a triangle formed by three lock members 44 bitten into corresponding cam surfaces 43, the inner circumferential member 42 is prevented from rotating in the second direction R2. In this manner, when the outer ring 41 and the inner circumferential member 42 are made eccentric to each other, a number of the lock members 44 which are firmly bitten between the cam surfaces 43 and the outer ring 41 increases. Accordingly, the inner circumferential member 42 can be reliably prevented from rotating in the second direction R2.

Next, referring to FIGS. 1 to 3, a series of the driving operation of the electric power tool 1 will be explained. The driver 15 at the standby position is held in a stopped state slightly below a top dead center. When the driver 15 is at the standby position, a last engagement portion 25*a* of the lift mechanism 22 engages a bottom surface of the lowermost rack tooth 15*a*. When the contact arm 3 is pushed by the workpiece W, the contact arm 3 moves upward. In conjunction with the contact arm 3, the adjuster 28 moves upward to push the projection pin 29*a* of the switch 29. Then, the switch 29 transmits an on-signal to the controller 9. When the controller 9 receives the on-signal from the switch 29 and the trigger 6 is pulled by a user, the controller 9 activates the electric motor 20. When the electric motor 20 is activated, the wheel 24 of the lift mechanism 22 starts to rotate. The last engagement portion 25*a* of the wheel 24 moves the lowermost rack tooth 15*a* upward. Accordingly, the driver 15 moves upward from the standby position to the top dead center.

When the driver 15 is in a stopped state at the standby position, the tip end 15*b* of the driver 15 is overlapped with a head of the frontmost driving member N in the front-rear direction. Because of this, a driving member N is not supplied within the driving passage 2*a*. When the tip end 15*b* of the driver 15 moves above the head of the frontmost driving member N, the frontmost driving member N is supplied within the driving passage 2*a*. When the driver 15 moves upward to the top dead center, the last engagement portion 25*a* disengages from the bottom surface of the lowermost rack tooth 15*a* owing to rotation of the wheel 24 immediately before the driver 15 drives the driving member N. The driver 15 moves downward by a biasing force caused by the pressure of the gas filled in the accumulation chamber 13, which is applied to the piston 14. The tip end 15*b* of the driver 15 moves downward to drive the driving member N within the driving passage 2*a*. The driving member N driven by the driver 15 ejects from the ejection port 2*b* into the workpiece W. When the driver 15 moves downward, all of the engagement portions 25 moves (retreats) rightward of the driving passage 2*a*. Accordingly, the rack teeth 15*a* of the driver 15 moving downward is prevented from being interfered with the engagement portions 25 of the wheel 24, thereby performing a smooth driving operation.

While the driver 15 is moving downward and after the driver 15 has reached a bottom dead center, the wheel 25 continues to rotate. When the driver 15 is at the bottom dead center and the wheel 24 rotates by a predetermined rotation angle, one of the engagement portions 25 engages a bottom surface of the uppermost rack tooth 15*a*. Accordingly, the driver 15 starts to move upward. When the last engagement portion 25*a* engages the bottom surface of the lowermost rack tooth 15*a*, the driver 15 returns to the standby position. For example, by properly measuring a time from when the electric motor 20 starts to rotate or measuring a rotation angle position of the wheel 24, the electric motor 20 is stopped in a state where the piston 14 returns to the standby position. Then, the driver 15 is in a stopped state at the standby position. In this manner, a series of driving operation is completed.

As discussed above, the electric power tool 1 includes the electric motor 20 as shown in FIG. 3. The electric power tool 1 includes the rotation direction restriction mechanism 40 for restricting a direction of an output rotation of the electric motor 20. The rotation direction restriction mechanism 40 includes the outer ring 41. Also, the rotation direction restriction mechanism 40 includes the inner circumferential member 42 arranged on an inner circumferential side of the outer ring 41. The rotation direction restriction mechanism 40 includes the plurality of cam surfaces 43 which are recessed on the outer circumferential surface 42*a* of the inner circumferential member 42. Also, the rotation direction restriction mechanism 40 includes the lock members 44, each of which is movable within a corresponding cam surface 43 such that the lock members 44 allow the inner circumferential member 42 to rotates relatively to the outer ring 41 in the first direction R1 and restrict in the second direction R2. The rotation direction restriction mechanism 40 further includes the protrusion 45 (eccentric mechanism) for making the outer ring 41 and the inner circumferential member 42 mutually eccentric.

Because of this configuration, when the outer ring 41 and the inner circumferential member 42 are made eccentric by the protrusion 45, a part of the plurality of cam surfaces 43 is located at a position where the outer ring 41 closely fits to the inner circumferential member 42 in the radial direction. Because of this configuration, at least one of the lock members 44 inserted into the cam surfaces 43 can closely fit both of the outer ring 41 and the inner circumferential member 42. Accordingly, when the inner circumferential member 42 starts to rotate relative to the outer ring 41, the lock member 44 is firmly bitten between the outer ring 41 and the inner circumferential member 42. Thus, relative rotation of the inner circumferential member 42 relating to the outer ring 41 can be reliably restricted in one direction.

As shown in FIGS. 3 and 6 to 8, the electric power tool 1 includes the gear case (retaining member) 34 that surrounds the outer ring 41. One of the outer ring 41 and the gear case 34 includes the projection 45 as an eccentric mechanism which protrudes toward and contacts the other. Because of this configuration, the outer ring 41 and the inner circumferential member 42 are made eccentric to each other by a simple structure in which the protrusion 45 is formed in either the outer ring 41 or the gear case 34. Accordingly, the rotation direction restriction mechanism 40, which reliably restricts the rotation direction in one direction, can be obtained without a large modification of the prior structure.

As shown in FIGS. 5 to 8, the cam surfaces 43 are formed in the inner circumferential member 42. Because of this configuration, when the inner circumferential member 42 rotates, the lock member 44 smoothly moves along a corresponding cam surface 43 owing to a centrifugal force of the inner circumferential member 42. Thus, allowance of rotation in the first direction R1 and restriction in the second direction can be reliably performed.

As shown in FIGS. 3 and 6 to 8, the electric power tool 1 includes the gear case (retaining member) 34 that surrounds the outer ring 41 and restricts rotation of the outer ring 41. The inner circumferential member 42 is driven to rotate by the electric motor 20. The outer ring 41 is arranged so as not to be rotatable integrally with the gear case 34, and the inner circumferential member 42 is arranged as a member that is rotated by the electric motor 20. Thus, the rotation direction restriction mechanism 40 can be arranged, for example, in the gear train which reduces and transmits an output of the electric motor 20.

As shown in FIG. 3, the electric power tool 1 includes the planetary gear mechanism 30 for reducing an output rotation speed of the electric motor 20. The planetary gear mechanism 30 includes the planetary gears 31*a* rotatably held by the inner circumferential member 42. Accordingly, the rotation direction restriction mechanism 40 which reliably restricts rotation direction in one direction can be formed in the planetary gear mechanism 30 which includes a lot of components with a small spacing.

As shown in FIGS. 3, 4 and 9, the planetary gear mechanism 30 includes the planetary gears 31*a* and the internal gear 31*b*. The internal gear 31*b* and the outer ring 41 are housed in parallel arrangement in the gear house 34. The outer diameter D2 of the outer ring 41 is smaller than the outer diameter D1 of the internal gear 31*b*. Because of this configuration, a clearance is formed between the outer circumferential surface 41*a* of the outer ring 41 and the inner circumferential surface 34*a* of the gear case 34. A center of the internal gear 31*b* is positioned at a center of the gear case 34. Thus, the outer ring 41 can be made eccentric relative to the center of the internal gear 31*b* by the clearance.

As shown in FIG. 3, the electric power tool 1 includes the planetary gear mechanism 30 for reducing the output rotation speed of the output of the electric motor 20. The planetary gear mechanism 30 includes the upstream-side internal gear 31*b*. The planetary gear mechanism 30 includes the upstream-side planetary gears 31*a* that engage the upstream-side internal gear 31*b*. The planetary gear mechanism 30 includes the downstream-side internal gear 32*c*. The planetary gear mechanism 30 includes the downstream-side planetary gears 32*b* that engage the downstream-side internal gear 32*c*. The upstream-side internal gear 31*b*, the outer ring 41 and the downstream-side internal gear 32*c* are housed in the gear case 34 in the front-rear direction in this order. The gear case 34 includes the protrusion 45 that protrudes towards and contacts the outer ring 41, which serves as the eccentric mechanism 45. Because of the presence of the protrusion 45, a part of the inner diameter of the gearcase 34 is smaller than the outer diameter D1 of both the upstream-side internal gear 31*b* and the downstream-side internal gear 32*c* (refer to FIG. 9).

Because of this configuration, the outer ring 41 can be assembled to the gear case 34 together with each of the components of the planetary gear mechanism 30. Furthermore, the protrusion 45 of the gear case 34 can be prevented from interfering with components except the outer ring 41 such as, for example, the upstream-side internal gear 31*b* and the downstream-side internal gear 32*c*. Accordingly, only the outer ring 41 can be made eccentric relative to the motor axis line J, which corresponds to the rotation center 42*b* of the inner circumferential member 42, without preventing driving of the planetary gear mechanism 30.

As shown in FIGS. 2 and 3, the electric power tool 1 includes the lift mechanism 22 for storing output energy of the electric motor 20. The electric power tool 1 includes the driver 15 that is movable in the driving direction to drive the driving member N owing to the output energy stored in the lift mechanism 22. The lift mechanism 22 stores energy owing to a forward rotation of the lift mechanism 22. If the lift mechanism 22 rotates in a reverse direction by the output energy, a part of the stored energy is lost, which causes a driving operation not to be fully performed. The rotation direction restriction mechanism 40 allows the lift mechanism 22 to rotate only in a forward direction, which restricts the stored energy from being lost unpreparedly.

As shown in FIG. 3, the electric motor 1 includes the planetary gear mechanism 30 for reducing the output rotation speed of the electric motor 20. The planetary gear mechanism 30 includes the upstream-side internal gear 31*b*. The planetary gear mechanism 30 includes the upstream-side planetary gears 31*a* that engage the upstream-side internal gear 31*b*. The planetary gear mechanism 30 includes the downstream-side internal gear 32*c*. The planetary gear mechanism 30 includes the downstream-side planetary gears 32*b* that engage the downstream-side gear 32*c*. The downstream-side internal gear 32*c* is arranged on the downstream side of the rotation direction restriction mechanism 40. Accordingly, the output speed of the electric motor 20 can be reduced in the downstream-side internal gear 32*c* on the downstream side of the rotation direction restriction mechanism 40. That is, the rotation direction restriction mechanism 40 can restrict the rotation direction in one direction in a stage where an output torque of the electric motor 20 is not so large. Because of this configuration, the rotation direction can be reliably restricted by the rotation direction restriction mechanism 40.

Next, a second embodiment of the present disclosure will be explained with reference to FIG. 11. The electric power tool 50 of the second embodiment includes a rotation direction restriction mechanism 51 instead of the rotation direction restriction mechanism 40 shown in FIG. 6. In the following explanation, descriptions which are not in common with the first embodiment will be explained. The rotation direction restriction mechanism 51 includes the outer circumferential carrier member 31*g* as an outer ring 52. The rotation direction restriction mechanism 51 includes the carrier 31*c* as an inner circumferential member 53. An outer circumferential surface 53*a* of the inner circumferential member 53 includes a plurality of cam surfaces 54. A lock member 55 is inserted within each of the cam surfaces 54. The inner circumferential member 53, the outer circumferential surface 53*a* and a rotation center 53*b* are formed in the same manner as the inner circumferential member 42, the outer circumferential surface 42*a* and the rotation center 42*b* shown in FIG. 6. The cam surfaces 54, a wide width portion 54*a*, a narrow width portion 54*b* and the lock member 55 are formed in the same manner as the cam surfaces 43, the wide width portion 43*a*, the narrow width portion 43*b* and the lock member 44 shown in FIG. 6.

Figure 11:
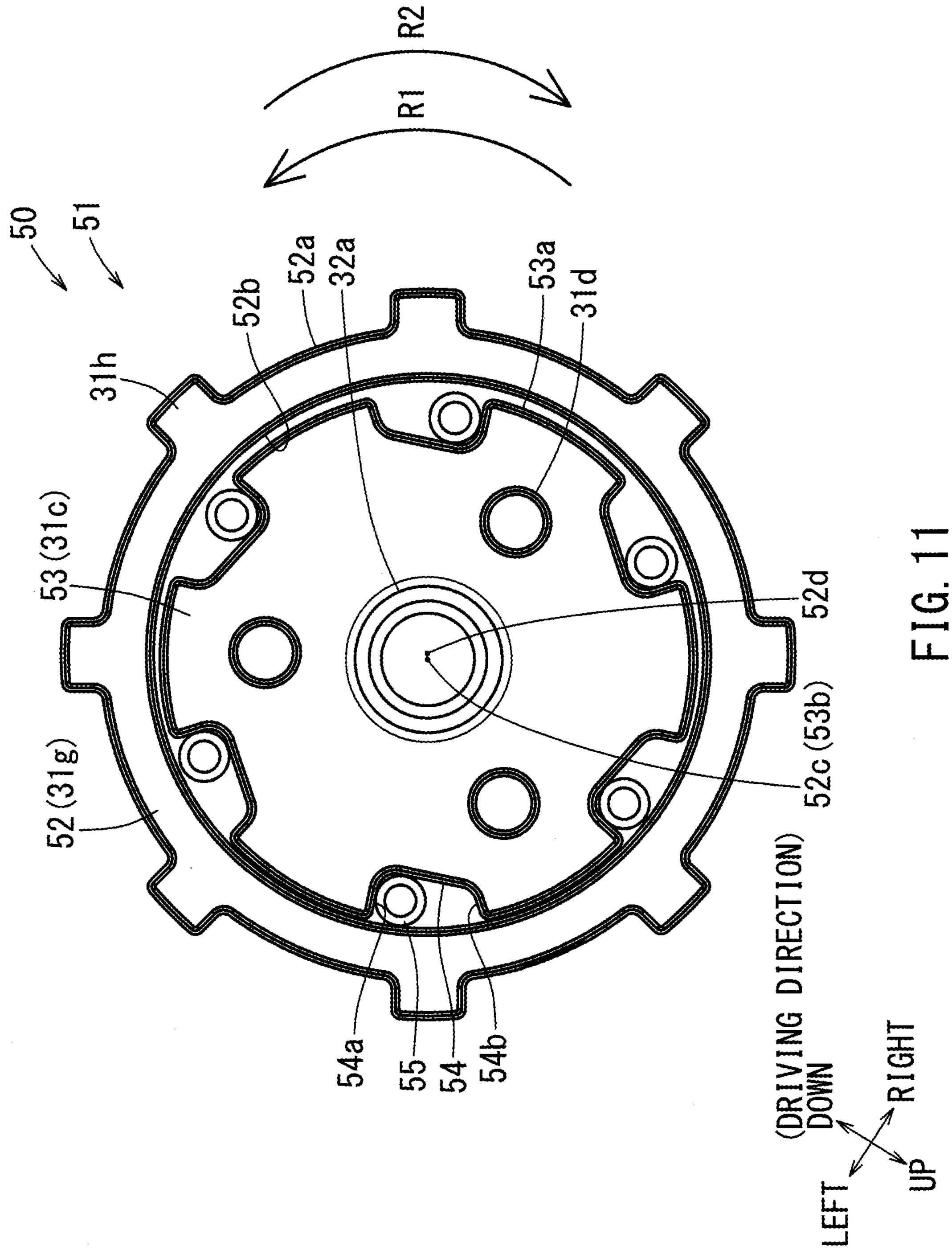
FIG. 11 is a front view of the rotation direction restriction mechanism according to a second embodiment of the present disclosure.

As shown in FIG. 11, an outer circumferential surface 52*a* and an inner circumferential surface 52*b* of the router ring 52 are made eccentric to each other. In more detail, a center 52*d* of the inner circumferential surface 52*b* is offset rightward relating to a center 52*c* of the outer circumferential surface 52*a*. A rotation center 53*d* of the inner circumferential member 53 is positioned at the center 52*c* of the outer circumferential surface 52*a*. Because of this configuration, the inner circumferential surface 52*b* of the outer ring 52 is made eccentric relative to the rotation center 53*d* of the inner circumferential member 53. Accordingly, in FIG. 11, a radial distance between the inner circumferential surface 52*b* of the outer ring 52 and the cam surface 54 on the left side becomes small. On the contrary, a radial distance between the inner circumferential surface 52*b* of the outer ring 52 and the cam surface 54 on the right side becomes large. Because of this configuration, the rotation direction restriction mechanism 51 works in the same manner as the rotation direction restriction mechanism 40 shown in FIGS. 6 to 8.

As shown in FIG. 11, when the inner circumferential member 53 rotates in the first direction R1, each of the lock members 55 moves toward a side of the wide width portion 54*a* of a corresponding cam surface 54. Accordingly, there is a clearance between each of the lock members 55 and the inner circumferential surface 52*b* of the outer ring 52. Because of this configuration, the lock members 55 do not prevent the inner circumferential member 55 from rotating in the first direction R1. On the contrary, when the inner circumferential member 53 starts to rotate in the second direction R2, each of the lock members 55 moves toward a side of the narrow width portion 54*b* of a corresponding cam surface 54. For example, at least three lock members 55 are bitten (engaged) between the inner circumferential surface 52*b* of the outer ring 52 and corresponding three cam surfaces 54. Accordingly, the inner circumferential member 53 can be reliably restricted from rotating in the second direction R2.

As discussed above, the inner circumferential member 53 is rotatable by the electric motor 20 as shown in FIG. 11. The outer ring 52 includes the inner circumferential surface 52*b* that is made eccentric relative to the rotation center 53*b* of the inner circumferential member 53. Accordingly, for example, when the inner circumferential member 53 rotates, the inner circumferential surface 52*b* of the outer ring 52 and the outer circumferential surface 53*a* of the inner circumferential member 53 are made eccentric to each other while an axial symmetry of the inner circumferential member 53 stays still. Thus, the inner circumferential member 53 can be restricted from being unsteadily rotated and being able to rotate in one direction.

Next, a third embodiment of the present disclosure will be explained with reference to FIG. 12. The electric power tool 60 of the third embodiment includes a rotation direction restriction mechanism 61 instead of the rotation direction restriction mechanism 40 shown in FIG. 6. In the following explanation, descriptions which are not in common with the first embodiment will be explained. The rotation direction restriction mechanism 61 includes the outer circumferential carrier member 31*g* as an outer ring 62. The rotation direction restriction mechanism 61 includes the carrier 31*c* as an inner circumferential member 63. An outer circumferential surface 63*a* of the inner circumferential member 63 includes a plurality of cam surfaces 64. A lock member 65 is inserted within each of the cam surfaces 64. The outer ring 62, the outer circumferential surface 62*a* and the inner circumferential surface 62*b* are formed in the same manner as the outer ring 41, the outer circumferential surface 41*a* and the inner circumferential surface 41*b* shown in FIG. 6. The cam surfaces 64, a wide width portion 64*a*, a narrow width portion 64*b* and the lock member 55 are formed in the same manner as the cam surfaces 43*m* the wide width portion 43*a*, the narrow width portion 43*b* and the lock member 44 shown in FIG. 6.

Figure 12:
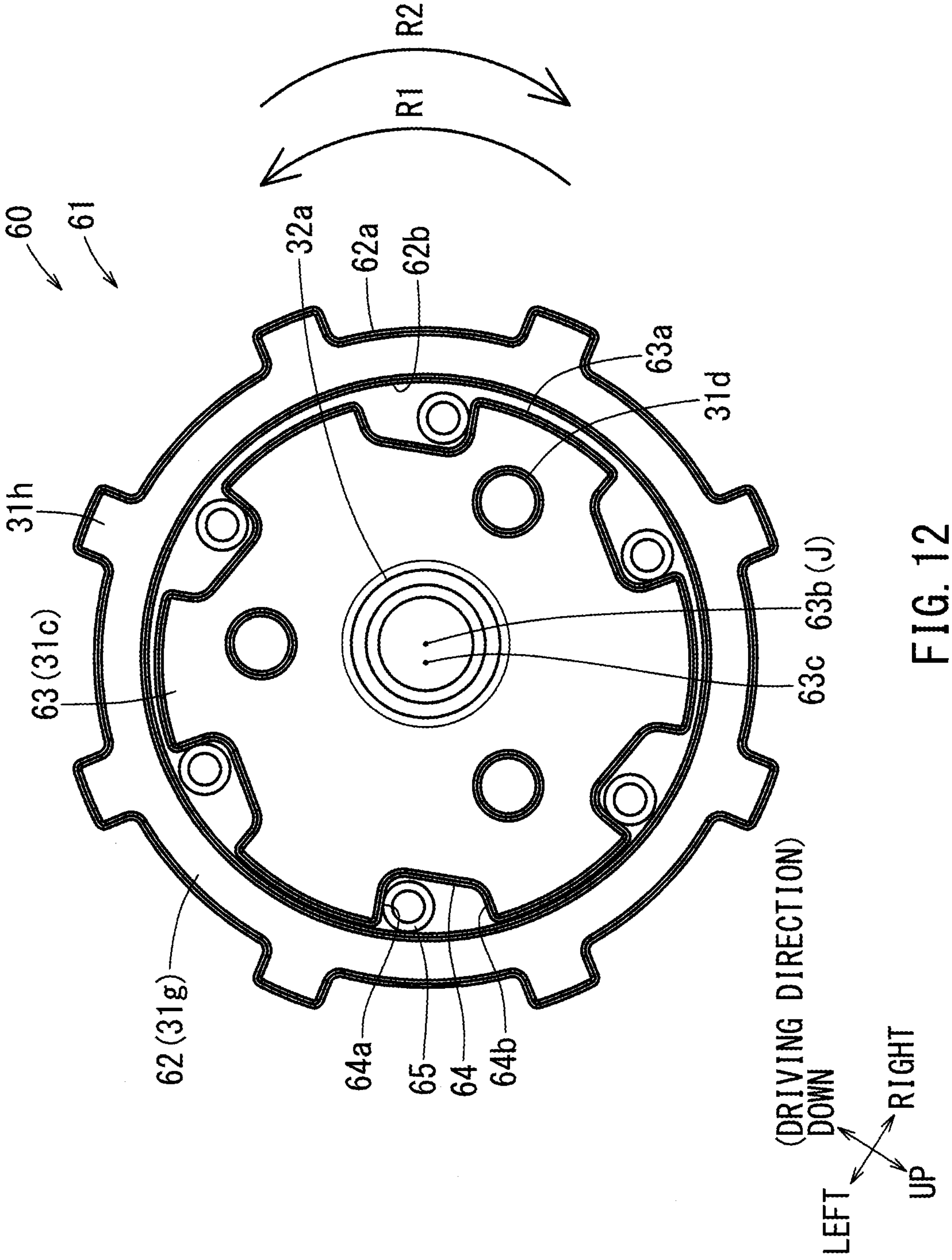
FIG. 12 is a front view of the rotation direction restriction mechanism according to a third embodiment of the present disclosure.

As shown in FIG. 12, the outer circumferential surface 63*a* of the inner circumferential member 63 is made eccentric relative to a rotation center 63*b*. An eccentric center 63*c* of the outer circumferential surface 63*a* is offset leftward relating to the rotation center 63*b* in FIG. 12. The inner circumferential surface 62*b* of the outer ring 62 is centered on the rotation center 63*b* of the inner circumferential member 63. Because of this configuration, in FIG. 12, a radial distance between the inner circumferential surface 62*b* of the outer ring 62 and the cam surface 64 on the left side becomes small. On the contrary, a radial distance between the inner circumferential surface 62*b* of the outer ring 62 and the cam surface 64 on the right side becomes large. Because of this configuration, the rotation direction restriction mechanism 61 works in the same manner as the rotation direction restriction mechanism 40 shown in FIGS. 6 to 8.

As shown in FIG. 12, when the inner circumferential member 63 rotates in the first direction R1, each of the lock members 65 moves toward a side of the wide width portion 64*a* of a corresponding cam surface 64. Accordingly, there is a clearance between each of the lock members 65 and the inner circumferential surface 62*b* of the outer ring 62. Because of this configuration, the lock members 65 do not prevent the inner circumferential member 63 from rotating in the first direction R1. On the contrary, when the inner circumferential member 63 starts to rotate in the second direction R2, each of the lock members 65 moves toward a side of the narrow width portion 64*b* of a corresponding cam surface 64. For example, at least three lock members 65 are bitten (engaged) between the inner circumferential surface 62*b* of the outer ring 62 and corresponding three cam surfaces 64. Accordingly, the inner circumferential member 63 can be reliably restricted from rotating in the second direction R2.

As discussed above, the inner circumferential member 63 is rotated by the electric motor 20 as shown in FIG. 12. The inner circumferential member 63 includes the outer circumferential surface 63*a* that is made eccentric relative to the rotation center 63*b* of the inner circumferential member 63. The outer ring 62 can be assembled in the same manner as the prior art configurations. The inner circumferential surface 62*b* of the outer ring 62 and the outer circumferential surface 63*a* of the inner circumferential member 63 are made eccentric to each other such that the inner circumferential member 63 rotates in one direction.

Next, a fourth embodiment of the present disclosure will be explained with reference to FIG. 13. The electric power tool 70 of the fourth embodiment includes a rotation direction restriction mechanism 71 instead of the rotation direction restriction mechanism 40 shown in FIG. 6. In the following explanation, descriptions which are not in common with the first embodiment will be explained. The rotation direction restriction mechanism 71 includes the outer circumferential carrier member 31*g* as an outer ring 72. The rotation direction restriction mechanism 71 includes the carrier 31*c* as an inner circumferential member 73. The gear case 34 includes a protrusion (eccentric mechanism 76) protruding radially inward on the inner circumferential surface 34*a* of the gear case 34. The protrusion 76 is formed in the same manner as the protrusion 45 shown in FIG. 6. The rotation direction restriction mechanism 71 includes lock members 75 in the same manner as the rotation direction restriction mechanism 40 includes the lock members 44 (refer to FIG. 6).

Figure 13:
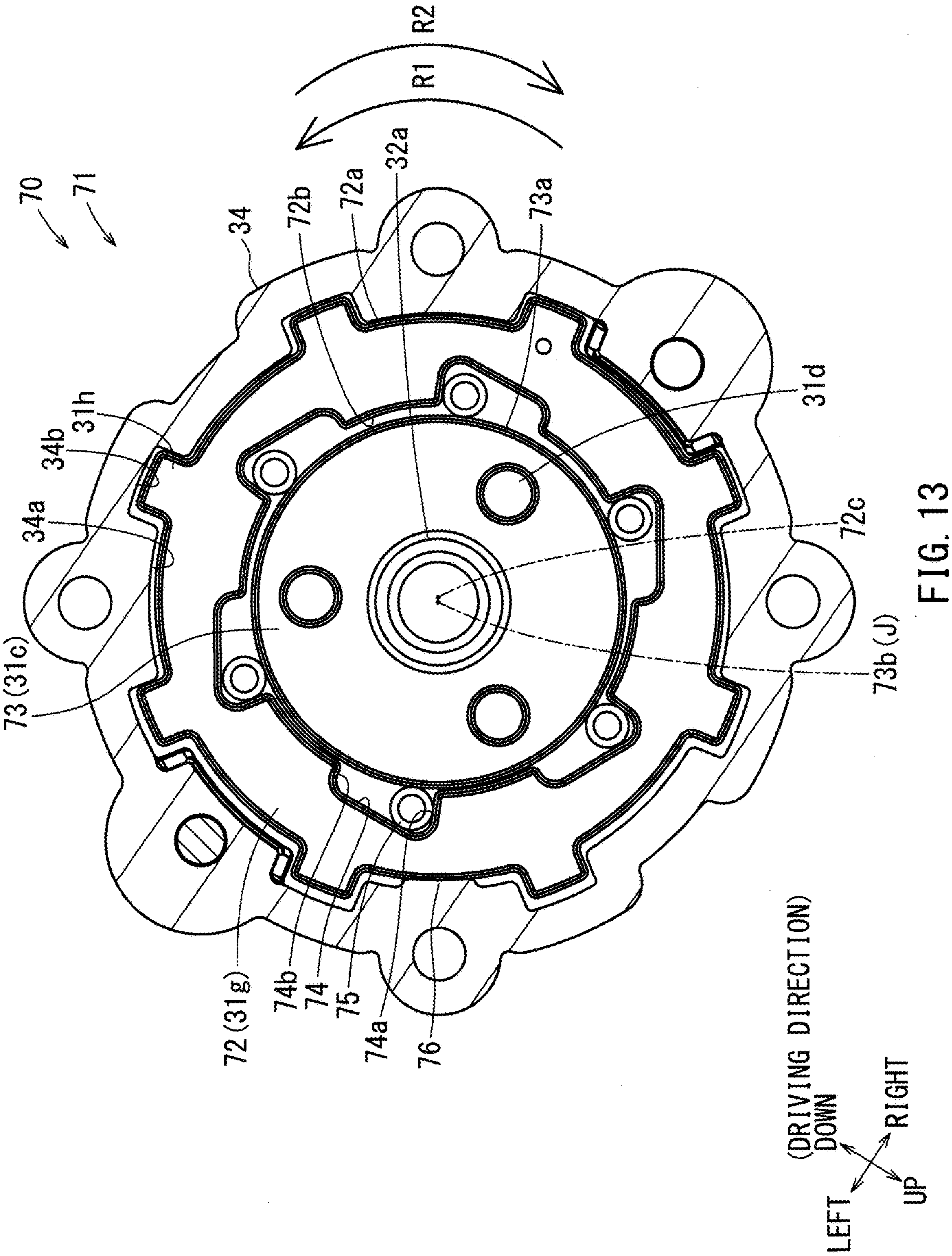
FIG. 13 is a front view of the rotation direction restriction mechanism according to a fourth embodiment of the present disclosure.

As shown in FIG. 13, the inner circumferential member 73 is formed in a disc shape without including cam surfaces. An outer circumferential surface 73*a* of the inner circumferential member 73 is centered on a rotation center 73*b*. An outer circumferential surface 72*a* and an inner circumferential surface 72*b* of the outer ring 72 extend in an arc-shape so as to be centered on a center 72*c* of the inner circumferential surface 72*b*. The inner circumferential surface 72*b* of the outer ring 72 includes a plurality of cam surfaces 74. Each of the plurality of cam surfaces 74 are recessed radially outward. The plurality of cam surfaces 74 are formed at approximately equal intervals along the circumferential direction of the inner circumferential surface 72*b*. For example, six cam surfaces 74 are formed at intervals of 60 degrees on the inner circumferential surfaces 72*b*. A lock member 75 is inserted within each of the plurality of cam surfaces 74.

As shown in FIG. 13, each of the plurality of cam surfaces 74 is formed asymmetric in the circumferential direction of the outer ring 72. Each of the cam surfaces 74 on a side of the first direction R1 (counterclockwise when viewed from the front) includes a wide width portion 74*a* which is wide in the radial direction of the outer ring 72. On the contrary, each of the cam surfaces 74 on a side of the second direction (clockwise when viewed from the front) includes a narrow width portion 74*b* which is narrow in the radial direction of the outer ring 72. A width of the wide width portion 74*a* in the radial direction is larger than a diameter of each of the lock members 75. A width of the narrow width portion 74*b* in the radial direction is smaller than the diameter of each of the lock members 75.

As shown in FIG. 13, the inner circumferential surface 72*b* of the outer ring 72 is made eccentric relatively to the outer circumferential surface 73*a* of the inner circumferential member 73 by the protrusion 76. A center 72*c* of the inner circumferential surface 72*b* of the outer ring 72 is offset rightward relating to a rotation center 73*b* of the inner circumferential member 73 as shown in FIG. 13. Because of this configuration, a radial distance between the cam surface 74 on the left side and the outer circumferential surface 73*a* of the inner circumferential member 73 is small. On the contrary, a radial distance between the cam surface 74 on the right side and the outer circumferential surface 73*a* of the inner circumferential member 73 is large. Accordingly, the rotation direction restriction mechanism 71 works in the same manner as the rotation direction restriction mechanism 40 shown in FIGS. 6 to 8.

As shown in FIG. 13, when the inner circumferential member 73 rotates in the first direction R1, each of the lock members 75 moves toward a side of the wide width portion 74*a* of a corresponding cam surface 74. Accordingly, there is a clearance between each of the lock members 75 and the outer circumferential surface 73*a* of the inner circumferential member 73. Because of this configuration, the lock members 75 do not prevent the inner circumferential member 73 from rotating in the first direction R1. On the contrary, when the inner circumferential member 73 starts to rotate in the second direction R2, each of the lock members 75 moves toward a side of the narrow width portion 74*b* of a corresponding cam surface 74. For example, at least three lock members 75 are bitten (engaged) between the outer circumferential surface 73*a* of the inner circumferential member 73 and corresponding three cam surfaces 64. Accordingly, the inner circumferential member 73 can be reliably restricted from rotating in the second direction R2.

As discussed above, the electric power tool 70 includes the electric motor 20 as shown in FIG. 3. The electric power tool 70 includes the rotation direction restriction mechanism 71 for restricting a direction of rotation caused by an output of the electric motor 20. The rotation direction restriction mechanism 71 includes the outer ring 72. Also, the rotation direction restriction mechanism 71 includes the inner circumferential member 73 arranged on an inner circumferential side of the outer ring 72. The rotation direction restriction mechanism 71 includes the plurality of cam surfaces 74 which are recessed on the inner circumferential surface 72*b* of the outer ring 72. The rotation direction restriction mechanism 71 includes lock members 75. Each of the lock members 75 is movable within a corresponding cam surface 74 such that the inner circumferential member 73 relating to the outer ring 72 is rotated relatively in the first direction R1 and restricted to rotate in the second direction R2. The rotation direction restriction mechanism 71 includes the protrusion 76 (eccentric mechanism) by which the outer ring 72 and the inner circumferential member 73 are made eccentric to each other.

Because of this configuration, when the outer ring 72 and the inner circumferential member 73 are made eccentric by the protrusion 76, a part of the plurality of cam surfaces 74 is located at a position where the outer ring 72 closely fits to the inner circumferential member 73 in the radial direction. Because of this configuration, at least one of the lock members 75 inserted into the cam surfaces 43 can closely fit both of the outer ring 72 and the inner circumferential member 73. When the inner circumferential member 73 starts to rotate relative to the outer ring 41, the lock member 75 is firmly bitten between the outer ring 72 and the inner circumferential member 73. Thus, relative rotation of the inner circumferential member 42 relating to the outer ring 41 can be reliably restricted in one direction.

The electric power tools 1, 50, 60 and 70 of the present disclosures discussed above may be modified in various ways. In the embodiments, a gas-spring type driving tool is illustrated as the electric power tool. Instead, the present disclosures may be applied to electric power tools such as, for example, a ratchet, a screwdriver, a caulking gun, a reciprocating saw, each of which includes a power transmission path for restricting a rotation direction to one direction.

The number of the cam surfaces and the lock members may not be limited to those in the above-discussed embodiments. In the above-discussed embodiments, the rotation direction restriction mechanism is arranged in the planetary gear mechanism 30. Instead, the rotation direction restriction mechanism may be arranged in a reduction gear train which does not include planetary gear trains. In the above-discussed embodiments, the rotation direction restriction mechanism are arranged in the planetary gear mechanism 30 including three-staged planetary gear trains. Instead, the rotation direction restriction mechanism may be arranged in a planetary gear mechanism including a two-staged or more than three-staged planetary gear trains.

In the above-discussed embodiments, the rotation direction restriction mechanism is arranged in the carrier 31*c* and the outer circumferential carrier member 31*g* of the first planetary gear train 31. Instead, the rotation direction restriction mechanism may be arranged in the carrier 32*d* and the outer circumferential carrier member 31*g* of the second planetary gear train 32. The three planetary gear train 33 is arranged on the downstream side of the second planetary gear train 32, and accordingly a torque is not increased to the maximum in the second planetary gear train 32. Thus, when a rotation is restricted in the second direction R2, a load applied to the rotation direction restriction mechanism is not large enough. Accordingly, there is a sufficient effect for restricting the rotation direction.

The above-discussed embodiments illustrates that the inner circumferential member rotates around its axis and the outer ring is held in the gear case 34 so as not to rotate. Instead, a configuration may be such that the outer ring is rotatable around its axis and the inner circumferential member is held so as not to rotate. Instead, another configuration may be such that the inner circumferential member and the outer ring are rotatable around each of its axis and a relative rotation of the former relative to the latter is varied.

We claim:

1. An electric power tool comprising:
an electric motor; and
a rotation direction restriction mechanism configured to restrict a direction of an output rotation of the electric motor, wherein,
the rotation direction restriction mechanism includes:
an outer ring;
an inner circumferential member being arranged on an inner circumferential side of the outer ring;
a plurality of cam surfaces being recessed on an inner circumferential surface of the outer ring or an outer circumferential surface of the inner circumferential member; and
a plurality of lock members each of which is configured to be movable within a corresponding cam surface such that the plurality of lock members allow the inner circumferential member to rotate relatively to the outer ring in a first direction and restrict in a second direction,
wherein the outer ring is configured to be eccentric relative to the inner circumferential member.

2. The electric power tool according to claim 1, wherein the inner circumferential member includes the plurality of cam surfaces.

3. The electric power tool according to claim 1, further comprising a retaining member configured to surround the outer ring and restrict a rotation of the outer ring,
wherein the inner circumferential member is driven to rotate by the electric motor.

4. The electric power tool according to claim 1, further comprising a planetary gear mechanism configured to reduce an output rotation speed of the electric motor,
wherein the planetary gear mechanism includes planetary gears rotatably held by the inner circumferential member.

5. The electric power tool according to claim 4, wherein,
the planetary gear mechanism includes an internal gear configured to engage the planetary gears,
the internal gear and the outer ring are housed in parallel arrangement in a gear case, and
an outer diameter of the outer ring is smaller than that of the internal gear.

6. The electric power tool according to claim 4, wherein, the planetary gear mechanism includes three-staged gear trains including a first planetary gear train, a second planetary gear train, and a third planetary gear train, and the first planetary gear train, the second planetary gear train, and the third planetary gear are arranged coaxially with an axis of the electric motor.

7. The electric power tool according to claim 6, wherein the rotation direction restriction mechanism is arranged in the first planetary gear train or in the second planetary gear train.

8. The electric power tool according to claim 1, further comprising a planetary gear mechanism configured to reduce an output rotation speed of the electric motor, wherein, the planetary gear mechanism includes an upstream-side internal gear, upstream-side planetary gears configured to engage the upstream-side internal gear, a downstream-side internal gear, and downstream-side planetary gears configured to engage the downstream-side internal gear, the upstream-side internal gear, the outer ring, and the downstream-side internal gear are configured to be housed in a gear case in this order, the gear case includes a protrusion which protrudes toward and contacts the outer ring, and the protrusion makes a part of an inner diameter of the gear case smaller than an outer diameter of the upstream-side internal gear and an outer diameter of the downstream-side internal gear.

9. The electric power tool according to claim 1, further comprising:

a lift mechanism configured to store an output energy of the electric motor; and a driver configured to be movable in a driving direction owing to the output energy stored in the lift mechanism for driving a driving member.

10. The electric power tool according to claim 9, wherein the driver is configured to move in a direction opposite to the driving direction by rotation of the electric motor in the first direction.

11. The electric power tool according to claim 1, further comprising a planetary gear mechanism configured to reduce an output rotation speed of the electric motor, wherein, the planetary gear mechanism includes an upstream-side internal gear, upstream-side planetary gears configured to engage the upstream-side internal gear, a downstream-side internal gear, and downstream-side planetary gears configured to engage the downstream-side internal gear, and the downstream-side internal gear is arranged on a downstream side of the rotation direction restriction mechanism.

12. The electric power tool according to claim 1, wherein each of the plurality of cam surfaces is formed asymmetrically in a circumferential direction of the inner circumferential member or the outer ring.

13. The electric power tool according to claim 12, wherein, each of the plurality of cam surfaces positioned on a side in the first direction includes a narrow width portion having a narrow width in a radial direction of the inner circumferential member or the outer ring, and each of the plurality of cam surfaces positioned on a side in the second direction includes a wide width portion having a wide width in a radial direction of the inner circumferential member or the outer ring.

14. The electric power tool according to claim 13, wherein the width of the wide width portion is larger than a diameter of the rock member and the width of the narrow width portion is smaller than the diameter of the rock member.

15. The electric power tool according to claim 1, wherein the rotation direction restriction mechanism includes six cam surfaces and six lock members.

16. An electric power tool comprising:

an electric motor; and a rotation direction restriction mechanism configured to restrict a direction of an output rotation of the electric motor, wherein, the rotation direction restriction mechanism includes:

an outer ring;

an inner circumferential member being arranged on an inner circumferential side of the outer ring;

a plurality of cam surfaces being recessed on an inner circumferential surface of the outer ring or an outer circumferential surface of the inner circumferential member;

a plurality of lock members each of which is configured to be movable within a corresponding cam surface such that the plurality of lock members allow the inner circumferential member to rotate relatively to the outer ring in a first direction and restrict in a second direction; and a retaining member configured to surround the outer ring for retaining the ring, wherein the outer ring is configured to be eccentric relative to the inner circumferential member by forming a protrusion arranged in one of the outer ring or the retaining member such that the protrusion protrudes toward and contacts the other.

17. The electric power tool according to claim 16, further comprising a gear case for housing a planetary gear mechanism configured to reduce an output rotation speed of the electric motor, wherein the retaining member is the gear case.

18. An electric power tool comprising:

an electric motor; and a rotation direction restriction mechanism configured to restrict a direction of an output rotation of the electric motor, wherein, the rotation direction restriction mechanism includes:

an outer ring;

an inner circumferential member being arranged on an inner circumferential side of the outer ring;

a plurality of cam surfaces being recessed on an inner circumferential surface of the outer ring or an outer circumferential surface of the inner circumferential member;

a plurality of lock members each of which is configured to be movable within a corresponding cam surface such that the plurality of lock members allow the inner circumferential member to rotate relatively to the outer ring in a first direction and restrict in a second, wherein:

the inner circumferential member is configured to be rotatable by the electric motor, the outer ring is configured to be eccentric relative to the inner circumferential member, thereby forming an eccentric mechanism, and the eccentric mechanism is configured such that the outer ring includes the inner circumferential surface configured to be eccentric relative to a rotation center of the inner circumferential member, or the inner circumferential member includes an outer circumferential surface configured to be eccentric relative to a rotation center of the inner circumferential member.

19. The electric power tool according to claim 18, wherein an outer circumferential surface and the inner circumferential surface of the outer ring are made eccentric to each other.

* * * * *